(12) United States Patent
Liu et al.

(10) Patent No.: US 10,538,441 B2
(45) Date of Patent: Jan. 21, 2020

(54) MOLYBDENUM DISULFIDE AND RELATED MATERIALS FOR WATER TREATMENT

(71) Applicant: The Board of Trustees of the Leland Stanford Junior University, Palo Alto, CA (US)

(72) Inventors: Chong Liu, Palo Alto, CA (US); Yi Cui, Stanford, CA (US)

(73) Assignee: The Board of Trustees of the Leland Stanford Junior University, Redwood City, CA (US)

(*) Notice: Subject to any disclaimer, the term of this patent is extended or adjusted under 35 U.S.C. 154(b) by 135 days.

(21) Appl. No.: 15/761,556

(22) PCT Filed: Sep. 21, 2016

(86) PCT No.: PCT/US2016/052937
§ 371 (c)(1),
(2) Date: Mar. 20, 2018

(87) PCT Pub. No.: WO2017/053466
PCT Pub. Date: Mar. 30, 2017

(65) Prior Publication Data
US 2018/0265381 A1 Sep. 20, 2018

Related U.S. Application Data

(60) Provisional application No. 62/221,451, filed on Sep. 21, 2015.

(51) Int. Cl.
*C02F 1/32* (2006.01)
*C02F 1/72* (2006.01)
(Continued)

(52) U.S. Cl.
CPC .............. *C02F 1/725* (2013.01); *C02F 1/32* (2013.01); *C02F 1/4672* (2013.01);
(Continued)

(58) Field of Classification Search
CPC .......... C02F 1/725; C02F 1/32; C02F 1/4672; C02F 1/46109; C02F 2001/46142;
(Continued)

(56) References Cited

U.S. PATENT DOCUMENTS 4,853,359 A * 8/1989 Morrison ................. B01J 27/04
502/220
5,541,096 A 7/1996 Nomura et al.
(Continued)

FOREIGN PATENT DOCUMENTS

CN 201310462452 1/2014
CN 201310289136 2/2015
WO WO2007/005038 1/2007

OTHER PUBLICATIONS

Zhou et al., "Vertically aligned MoS2/MoOx heterojunction nanosheets for enhanced visible-light photocatalytic activity and photostability", 2014, CrystEngComm v16 9025.
(Continued)

*Primary Examiner* — Walter D. Griffin
*Assistant Examiner* — Cameron J Allen
(74) *Attorney, Agent, or Firm* — Lumen Patent Firm

(57) ABSTRACT

Catalytic water treatment is provided using an active material driven with an optical and/or electrical excitation. The active material is $MoS_2$, $MoSe_2$, $WS_2$, $WSe_2$, $Mo_xW_{1-x}S_2$, $Mo_xW_{1-x}Se_2$, $MoS_ySe_{2-y}$, $WS_ySe_{2-y}$, or $Mo_xW_{1-x}S_ySe_{2-y}$; wherein $0<x<1$ and $0<y<2$. The active material is configured as one or more layered nanostructures having exposed layer edges. A metal catalyst is disposed on the active material. The combined structure of active material and metal catalyst is disposed in the water to be treated. The excitation is provided to the active material to generate one or more reactive oxygen species by dissociation of water, wherein the reactive oxygen species provide water treatment.

9 Claims, 24 Drawing Sheets

(51) Int. Cl.
*C02F 1/467* (2006.01)
*C02F 1/461* (2006.01)

(52) U.S. Cl.
CPC .............. *C02F 1/46109* (2013.01); *C02F 2001/46142* (2013.01); *C02F 2201/009* (2013.01); *C02F 2303/04* (2013.01); *C02F 2305/023* (2013.01); *C02F 2305/10* (2013.01)

(58) Field of Classification Search
CPC ............ C02F 2305/023; C02F 2305/10; C02F 2201/009; C02F 2303/04; B01J 35/004; B01J 27/051
See application file for complete search history.

(56) References Cited

U.S. PATENT DOCUMENTS 6,245,200 B1 * 6/2001 Wilcoxon ................ A62D 3/10
204/157.15
7,223,713 B2 * 5/2007 Alonso ................ B01J 27/051
502/177
2012/0267321 A1 10/2012 Kisalius et al.

OTHER PUBLICATIONS

James et al., "Photocatalytic properties of free and oxide-supported MoS2 and WS2 nanoparticles synthesized without surfactants", 2013, J. Photochem. and photobio. A: chemistry, v262, 45-51.
Wang et al., "Electrochemical tuning of vertically aligned MoS2 nanofilms and its application in improving hydrogen evolution reaction", 2013, PNAS v110n49, pp. 19701-19706.
Kong et al., "Synthesis of MoS2 and MoSe2 Films with Vertically Aligned Layers", 2013, Nano Letters v13, pp. 1341-1347.
Quinn et al., "Aqueous Dispersions of Exfoliated Molybdenum Disulfide for Use in Visible-Light Photocatalysis", 2013, Applied Materials and Interfaces v5, pp. 12751-12756.

* cited by examiner

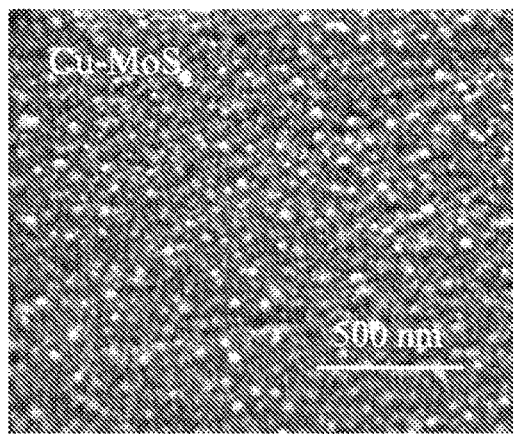 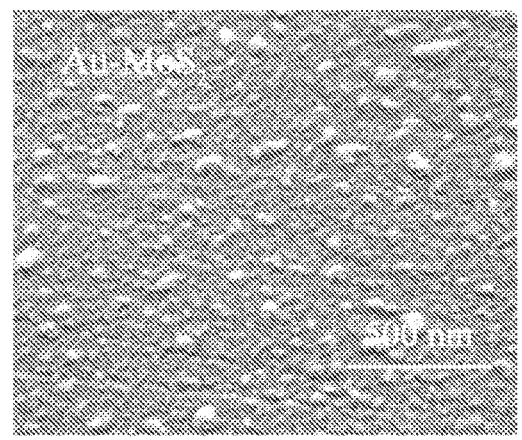
FIG. 14A          FIG. 14B
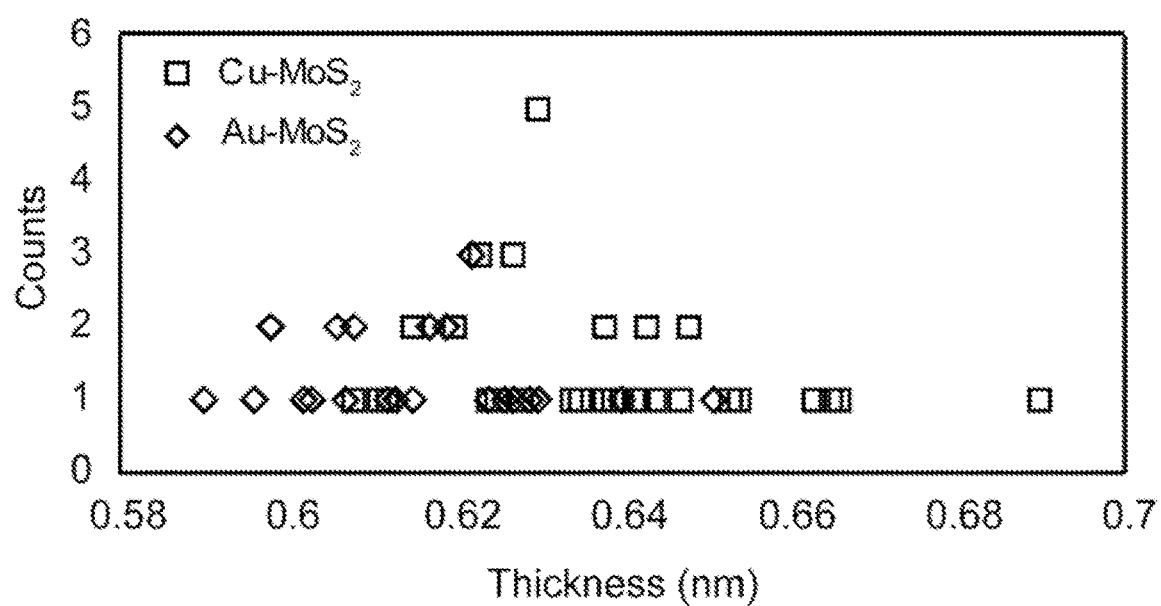
FIG. 15

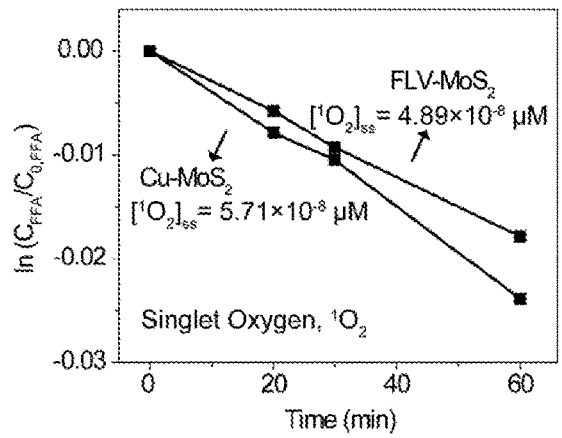
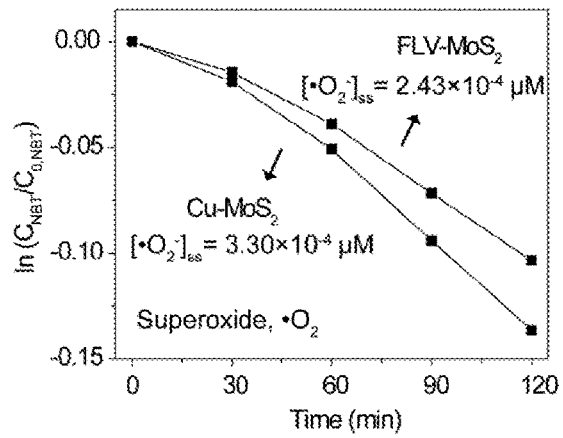
FIG. 16A
FIG. 16B
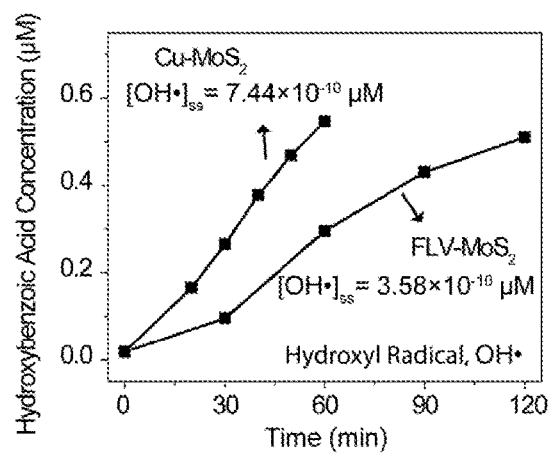
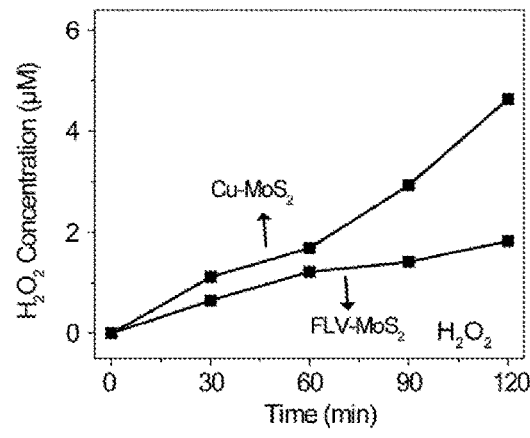
FIG. 16C
FIG. 16D

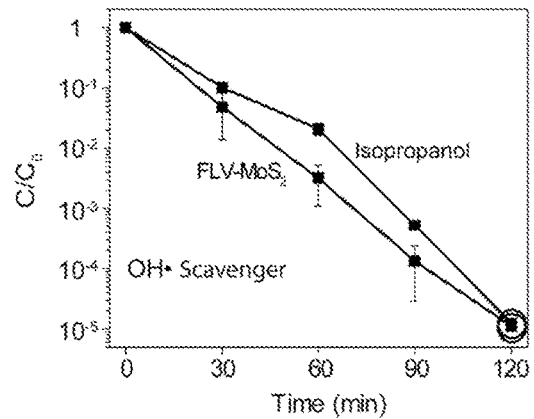 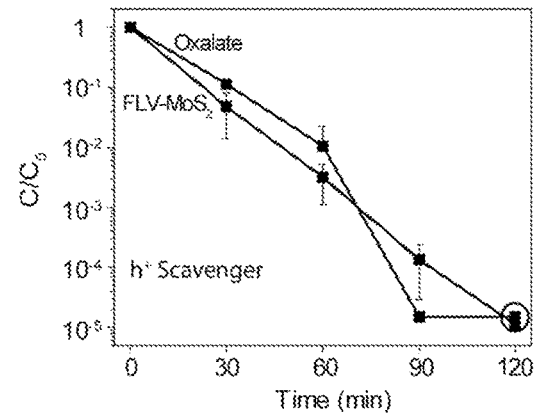
FIG. 17E  FIG. 17F
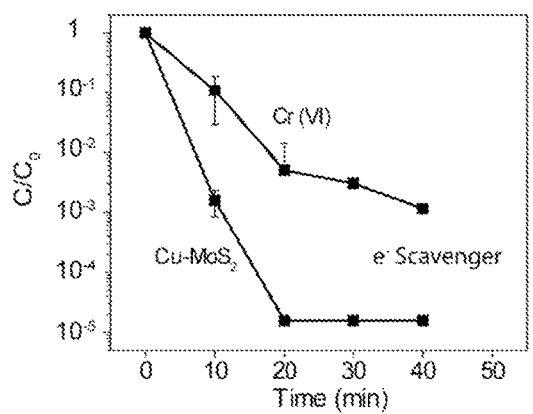 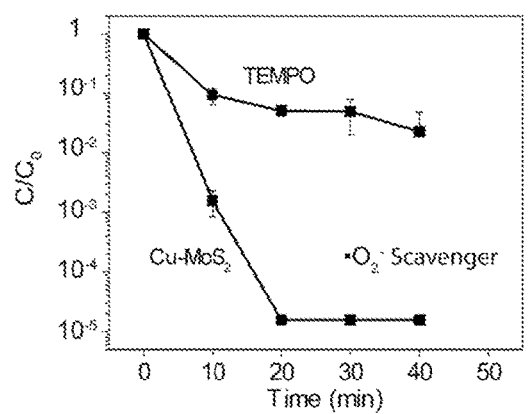
FIG. 18A  FIG. 18B

MOLYBDENUM DISULFIDE AND RELATED MATERIALS FOR WATER TREATMENT

CROSS-REFERENCE TO RELATED APPLICATIONS

This application is a 371 of PCT/US2016/052,937 filed on Oct. 21, 2016. PCT/US2016/052,937 filed on Oct. 21, 2016 claims the benefit of U.S. Provisional Application 62/221,451 filed on Oct. 21, 2015.

STATEMENT OF GOVERNMENT SPONSORED SUPPORT

This invention was made with Government support under contract DE-AC02-76SF00515 awarded by the Department of Energy. The Government has certain rights in the invention.

FIELD OF THE INVENTION

This invention relates to water treatment.

BACKGROUND

Providing potable water can be difficult, especially in undeveloped locations where water treatment infrastructure is not available. One approach for addressing this need is photocatalytic water treatment, where a catalyst is placed in water to be treated and then illuminated to provide energy for desired chemical reactions.

However, existing materials (e.g., $TiO_2$) for photocatalytic water treatment tend to suffer from the disadvantage of only absorbing a small part of the solar spectrum, thereby reducing efficiency and the speed/efficacy of treatment. Attempts have been made to alleviate this loss of efficiency, but the resulting materials and structures tend to be costly due to fabrication complexity and/or difficulties. Accordingly, it would be an advance in the art to provide improved catalyst-based water treatment.

SUMMARY

The above-described problem can be addressed by the following water treatment method. An active material that is $MoS_2$, $MoSe_2$, $WS_2$, $WSe_2$, $Mo_xW_{1-x}S_2$, $Mo_xW_{1-x}Se_2$, $MoS_ySe_{2-y}$, $WS_ySe_{2-y}$, or $Mo_xW_{1-x}S_ySe_{2-y}$ ($0<x<1$ and $0<y<2$) is used. The experimental work described below considers the case of $MoS_2$, and the other materials listed here are expected to have similar relevant properties to $MoS_2$. The active material is configured as one or more layered nanostructures having exposed layer edges. A metal catalyst is disposed on the active material. The combined structure of active material and metal catalyst is disposed in the water to be treated. An excitation is provided to the active material to generate one or more reactive oxygen species by dissociation of water, wherein the reactive oxygen species provide water treatment.

FIG. 1B shows an example. Here container 102 holds water to be treated 104. Active material 108 is disposed on a substrate 106 as a layered nanostructure having exposed layer edges 110. Metal catalyst 112 is disposed on active material 108, preferably on the exposed edges 110 as shown. Two kinds of excitation are shown on FIG. 1B, optical excitation 124 and electrical excitation provided by a voltage from voltage source 116 applied between the active material 108 and a return electrode 114. Embodiments of the invention can have completely optical excitation, completely electrical excitation, or any combination of optical and electrical excitation.

The excitation of the active material leads to the production of reactive oxygen species 118 (black stars on FIG. 1B). These reactive oxygen species provide desirable water treatment. For example, reactive oxygen species can turn live bacteria 120 (solid ovals on FIG. 1B) into dead bacteria 122 (outline ovals on FIG. 1B). In this example, the water treatment provides disinfection of water by killing biological contaminants with the reactive oxygen species. Alternatively, the water treatment can provide chemical treatment of water by reacting chemical contaminants with the reactive oxygen species. In this alternative case, 120 would be the chemical contaminants, and 122 schematically shows the less-toxic reaction products of the decontamination reaction(s) provided by the reactive oxygen species.

Practice of the invention does not depend critically on the specific material chosen for the metal catalyst. Based on the experimental work described below, Cu, Au and alloys or mixtures thereof are suitable materials. However, the metal catalyst can be any material that improves production of reactive oxygen species relative to other competing chemical reactions. Practice of the invention also does not depend critically on the structural configuration of the metal catalyst. It can be configured as a continuous thin layer, or as a micro- or nano-structured deposit on the active material. Here micro-scale structures have relevant dimensions of 100 μm or less, and nano-scale structures have relevant dimensions of 100 nm or less.

BRIEF DESCRIPTION OF THE DRAWINGS

In all plots of disinfection performance, error bars represent the standard deviation of three repeated measurements and data points with a circle mean that no live bacteria were detected.

FIG. 14A is a top view SEM image showing the morphology of Cu—MoS$_2$ a after sputtering.

FIG. 14A is a top view SEM image showing the morphology of Au—MoS$_2$ a after sputtering.

FIG. 15 shows statistical data of Cu—MoS$_2$ and Au—MoS$_2$ layer spacing measured from TEM images.

FIG. 16A shows measured steady state concentration of [$^1$O$_2$]$_{ss}$ calculated from the decay of FFA.

FIG. 16B shows measured steady state concentration of [·O$_2^-$]$_{ss}$ calculated from the decay of NBT.

FIG. 16C shows measured steady state concentration of [OH·]$_{ss}$ calculated from the generation of hydroxybenzoic acid.

FIG. 16D shows measured H$_2$O$_2$ accumulation over time.

FIG. 17E shows photocatalytic disinfection performance of FLV—MoS$_2$ with scavenger isopropanol to quench photo generated OH·.

FIG. 17F shows photocatalytic disinfection performance of FLV—MoS$_2$ with scavenger sodium oxalate to quench photo generated h$^+$.

FIG. 18A shows photocatalytic disinfection performance of Cu—MoS$_2$ with scavenger sodium chromate to quench photo generated e$^-$.

FIG. 18B shows photocatalytic disinfection performance of Cu—MoS$_2$ with scavenger TEMPO to quench photo generated ·O$_2^-$.

DETAILED DESCRIPTION

Section A describes an experimental demonstration of the above-described principles. Section B is supplemental information relating to the experiments of section A.

A) Rapid Water Disinfection Using Vertically Aligned MoS2 Nanofilms and Visible Light A1) Introduction Rapid and energy-efficient water disinfection methods are urgently required to address global challenges related to energy and. water scarcity. Solar energy is an attractive renewable energy resource and can be used for water disinfection via solar disinfection of drinking water (SODIS), an approach employed throughout the world, particularly in developing countries lacking potable water distribution systems, for disinfecting water for consumption. Sunlight can inactivate microorganisms via direct or indirect mechanisms. Direct mechanisms involve photons (usually UVB or JAW directly interacting with nucleic acids or other essential macromolecules to cause inactivation. Indirect mechanisms involve photons (UV or visible) interacting with chromophores either within the organism or external to the organism to create reactive oxygen species (ROS) that subsequently cause inactivation. To date, most studies suggest the disinfection by UV photons is one of the most important means of inactivating waterborne pathogens. However, energy in UVA and UVB collectively only account for 4% of the energy in the solar spectrum, so SODIS is time-consuming (requires 6-48 hours exposure time). It would be desirable to more effectively harness energy in photons from the visible range to speed up photoinactivation.

Figure 1A:
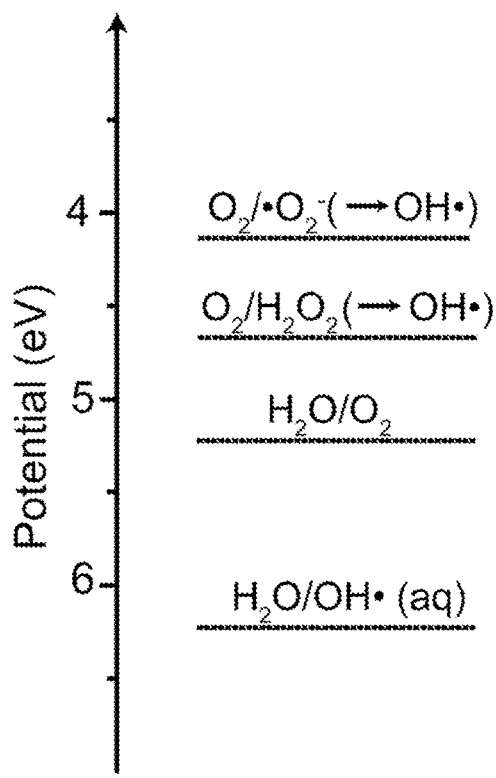
FIG. 1A shows ROS formation potentials with respect to vacuum level.

One way is to use a semiconductor-based photocatalyst. When a photocatalyst absorbs light, it generates electron-hole pairs so that electrons and holes can react with water and dissolved oxygen separately to generate ROS. ROS, such as hydroxyl radical, singlet oxygen, and superoxide, are strong oxidants and can disinfect pathogens by damaging essential macromolecules. Technically, the potentials (vs. Normal Hydrogen Electrode (NHE)) for ROS production (pH 7) at the electron side for oxygen reductions are −0.33 V ($O_2/\cdot O_2^-$), 0.28 V ($O_2/H_2O_2$) and at the hole side for water oxidation are 1.1-1.9 V ($H_2O/OH\cdot$), 0.82 V ($H_2O/O_2$) (FIG. 1A) so that it is possible for an efficient photocatalyst to use the whole visible light range of solar spectrum. However, the bandgap of the most studied metal oxide photocatalysts are typically too large so most of the visible part of the solar spectrum is not utilized. For example, $TiO_2$ has a bandgap of 3.0-3.2 eV and only harvests UV light. Lowering the bandgap of $TiO_2$ and enabling its absorption of visible light usually involves complex synthesis such as doping with N, S or Fe, making hybrid composites with lower bandgap materials and advanced structural design which limits its practical application for photocatalytic applications. Besides lowering the bandgap of metal oxides, research has investigated the potential for new semiconductor materials with small bandgap such as $C_3N_4$ (2.7 eV, cutoff wavelength 459 nm), red phosphorus (1.42 eV, cutoff wavelength 873 nm) as photocatalysts that utilize visible light. The disinfection efficacy, specifically the disinfection rate, of these materials is still far from practical application. To seek novel photocatalysts that can harvest visible light for fast water disinfection is extremely attractive.

Figure 1B:
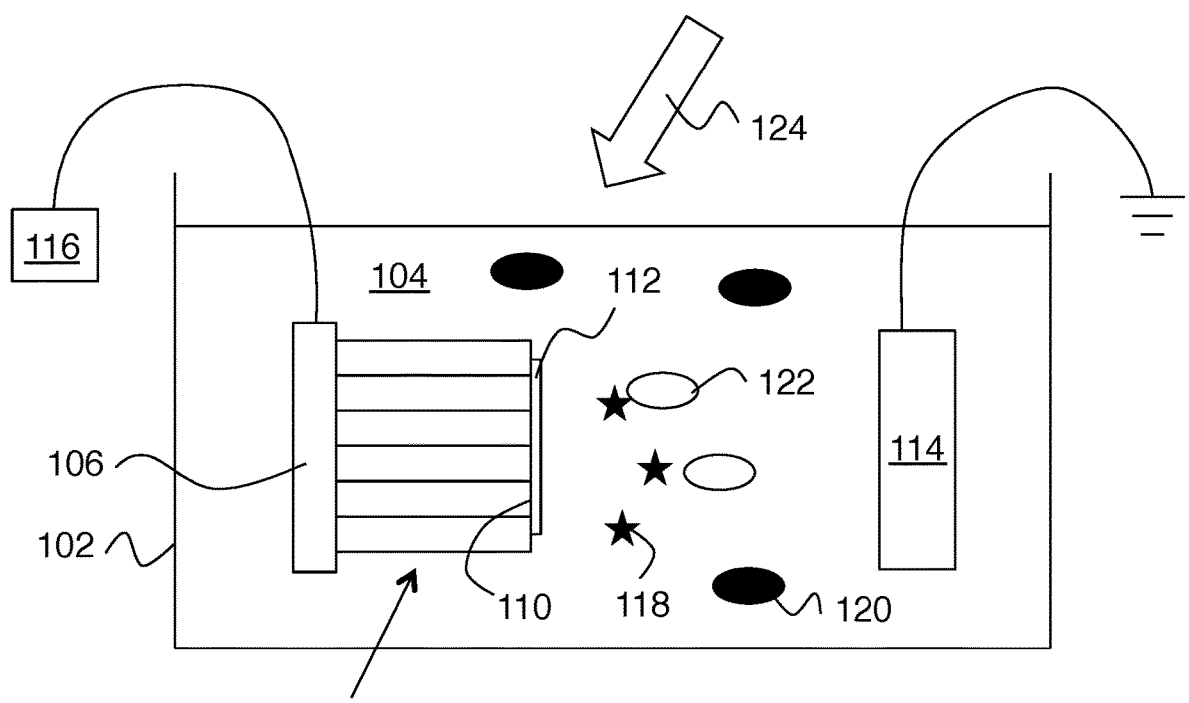
FIG. 1B is a schematic showing FLV—$MoS_2$ inactivating bacteria in water through visible light photocatalytic ROS generation.

$MoS_2$, a prototypical layered transition metal dichalcogenide (TMD), is an emerging semiconductor material with physical and chemical properties conducive to applications in transistors, electrocatalysts for hydrogen evolution reaction. Single or few-layered sheets of $MoS_2$ exhibit intriguing properties distinct from bulk $MoS_2$. By decreasing the thickness of $MoS_2$ to few layers or single layer, its bandgap changes from an indirect bandgap of 1.3 eV to a direct bandgap of 1.9 eV. Also, nanostructured $MoS_2$ would benefit the separation of electron-hole pairs by decreasing the distances for electrons and holes to diffuse to the surface of the materials and also increase the reaction sites. Here we report the successful use of few layered vertically aligned $MoS_2$ (FLV—$MoS_2$) as a photocatalyst for water disinfection under visible light illumination (FIG. 1B). The FLV—$MoS_2$ has great potential for photocatalytic water disinfection owing to its low-cost and straightforward synthesis. FLV—$MoS_2$ showed much faster disinfection than $TiO_2$ under both visible light and sunlight illumination. Because semiconductor materials are nonspecific in catalyzing ROS production among other competing reactions (such as hydrogen evolution, oxygen reduction and oxidation), to promote the production of ROS, additional catalysts Cu or Au were deposited onto the $MoS_2$ films. With 5 nm of Cu or Au as reaction catalysts as well as to facilitate the separation of electron-hole pairs, FLV—$MoS_2$ achieved rapid water disinfection with 5 log (>99.999%) inactivation of *Escherichia coli* within 20 min or 60 min, respectively, comparing to pristine FLV—$MoS_2$ of 120 min.

A2) Growth and Characterization of FLV—$MoS_2$.

Figure 2A:
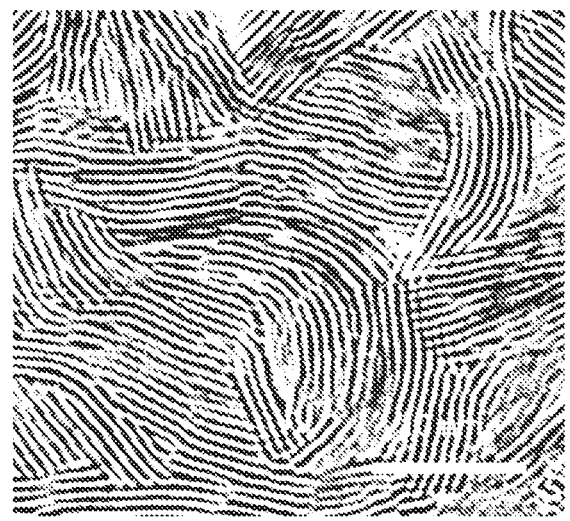
FIG. 2A is a top view TEM image of FLV—$MoS_2$ showing the as-grown vertically standing layers.

The FLV—$MoS_2$ was grown by first sputtering Mo film on glassy carbon (GC) substrate and then sulfurize at 500° C. for 10 min. The sulfurization was conducted in a sulfur-rich environment and the $MoS_2$ film thickness was determined by the initial thickness of Mo film sputtered. The transmission electron microscopy (TEM) images of the 40 nm $MoS_2$ film are shown in FIG. 2A. It is clear that the as-grown $MoS_2$ film is composed of vertically aligned layers of $MoS_2$ with domain sizes around 3-10 layers. Reports have demonstrated that $MoS_2$ has higher in-plane electrical conductivity and also higher catalytic activity on the edge sites, which means this vertically-aligned structure can have better electron-hole transport from $MoS_2$ to electrolytes. For photoelectrochemical reactions, the material band structure is the key factor that directly determines the mechanism, products, and efficiency.

Figure 2B:
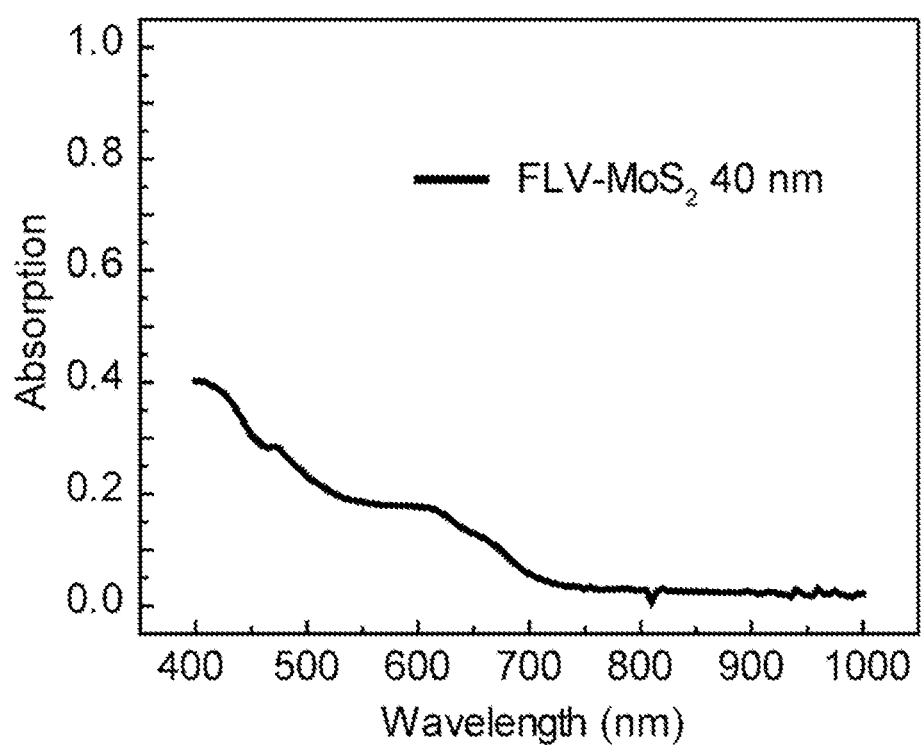
FIG. 2B is an absorption spectrum of 40 nm FLV—$MoS_2$.
Figure 2C:
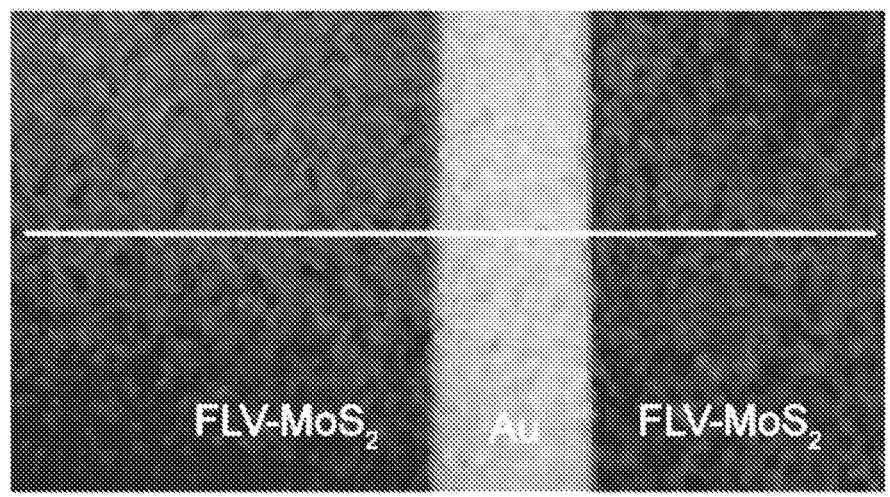
FIG. 2C is a photograph of the FLV—$MoS_2$ film patterned with Au line for scanning KP measurement.
Figure 2D:
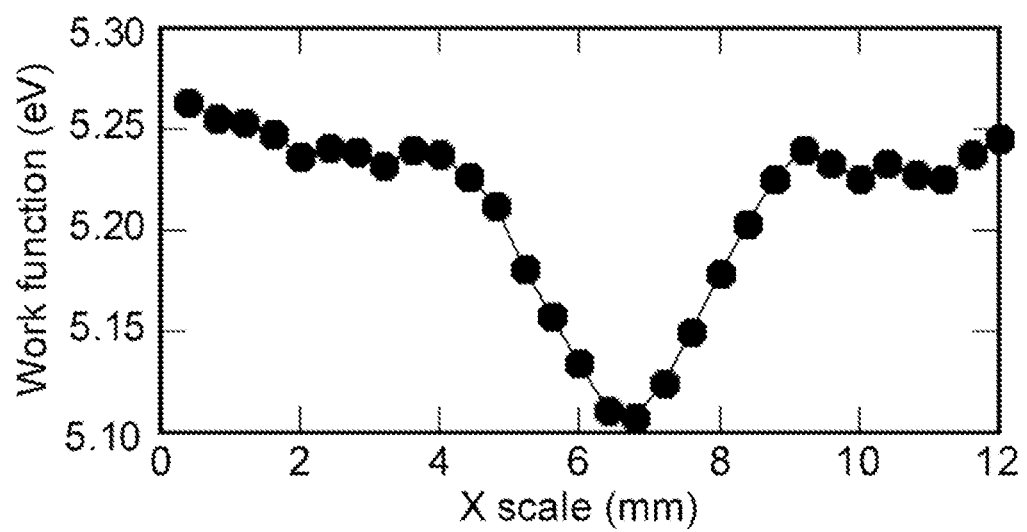
FIG. 2D is line scan data showing the fermi level of FLV—$MoS_2$ at each position on the white line in FIG. 2C.
Figure 2E:
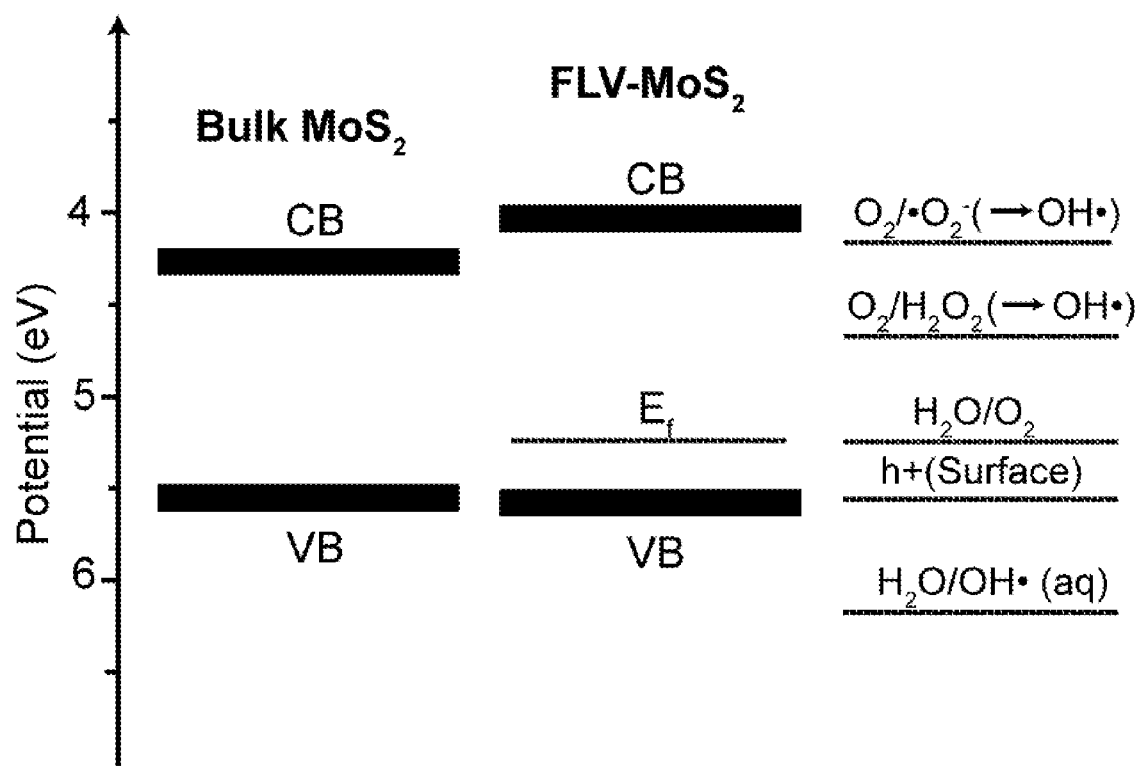
FIG. 2E shows the band position of FLV—$MoS_2$ with respect to ROS formation potential and bulk $MoS_2$ band position.
Figure 5:
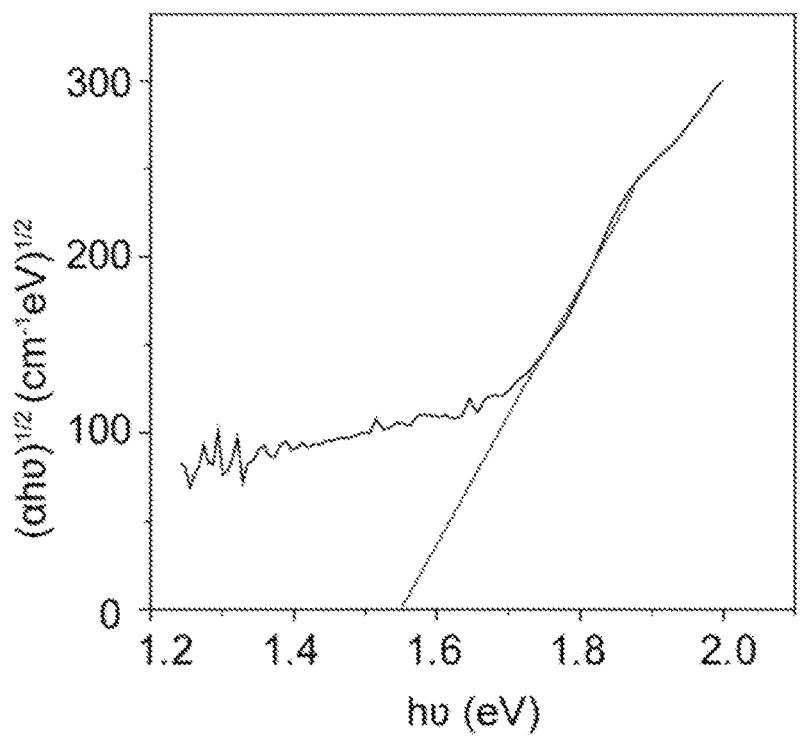
FIG. 5 shows bandgap extraction for indirect bandgap semiconductor. α is the absorption coefficient and hυ is the photon energy.
Figure 6A:
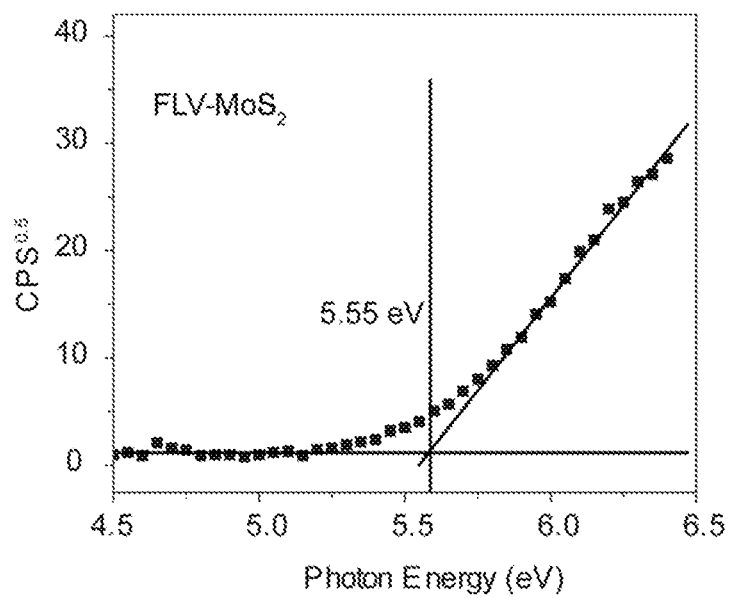
FIGS. 6A-B show UPS data measuring the valence band edge of FLV—MoS$_2$ (FIG. 6A) and bulk MoS$_2$ (FIG. 6B).
Figure 6B:
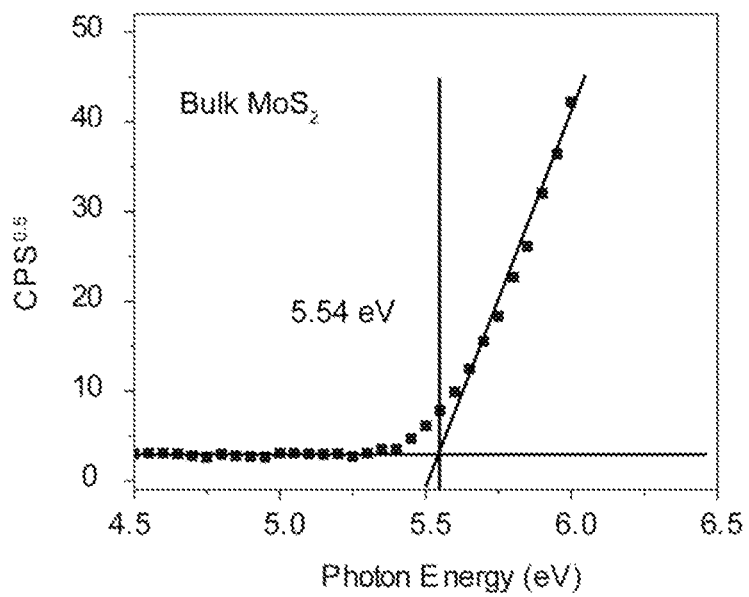

Therefore, the properties of the vertically-aligned $MoS_2$ were characterized. First, the bandgap was characterized by measuring the absorption spectrum of $MoS_2$. The absorption spectra of 40 nm $MoS_2$ are shown in FIG. 2B. The bandgap value was extracted from the relation between absorption coefficient and photon energy for the indirect bandgap semiconductor. The plot of $(\alpha h\upsilon)^{1/2}$ versus $h\upsilon$ is shown in FIG. 5. The bandgap extraction gives 1.55 eV for 40 nm FLV—$MoS_2$. This allows FLV—$MoS_2$ to absorb light up to 800 nm wavelength and the solar spectrum utilization is also increased to ~50% in energy comparing to $TiO_2$ of 4%. The Fermi level of FLV—$MoS_2$ was characterized by scanning Kelvin probe force microscopy and the results are shown in FIGS. 2C-D. Au line was patterned on the $MoS_2$ film as a reference because it has a stable work function of 5.1 eV. FIG. 2D shows the line scan data on the $MoS_2$ film crossing the Au pattern. The Fermi level of $MoS_2$ on the line scan ranges from 5.23 to 5.26 eV with an average of 5.24 eV. A Fermi level mapping of a 1.5×12 $mm^2$ area showed that the line scan of FIG. 2D is representative over this area. The average Fermi level across this area was ~5.24 eV. The valence band position of FLV—$MoS_2$ was confirmed to be 5.55 eV using ultraviolet photoelectron spectroscopy (UPS) and the results are shown in FIG. 6A. Hence, the band position of FLV—$MoS_2$ with respect to ROS reaction potential and also band position of bulk $MoS_2$ are shown in FIG. 2E. The valence band position for bulk $MoS_2$ is 5.54 eV (FIG. 6B). It is clear that FLV—$MoS_2$ is suitable for ROS generation for photocatalytic water disinfection.

A3) Photocatalytic Disinfection Performance of FLV—$MoS_2$.

Figure 3A:
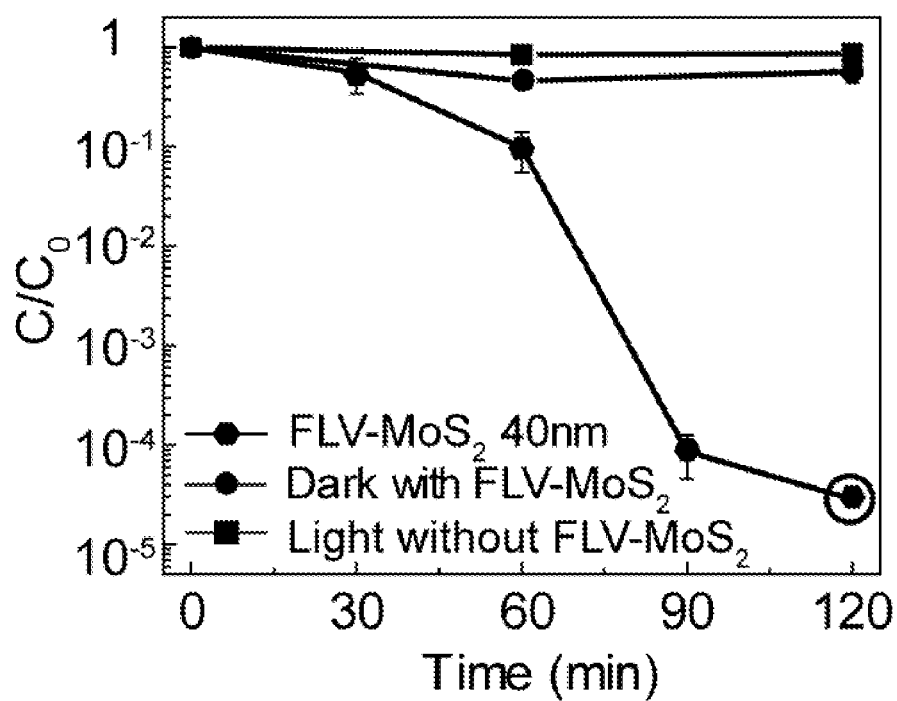
FIG. 3A is a comparison of disinfection performance of FLV—$MoS_2$ to light control without FLV—$MoS_2$ and FLV—$MoS_2$ in dark to confirm the visible light photocatalytic effect.
Figure 3B:
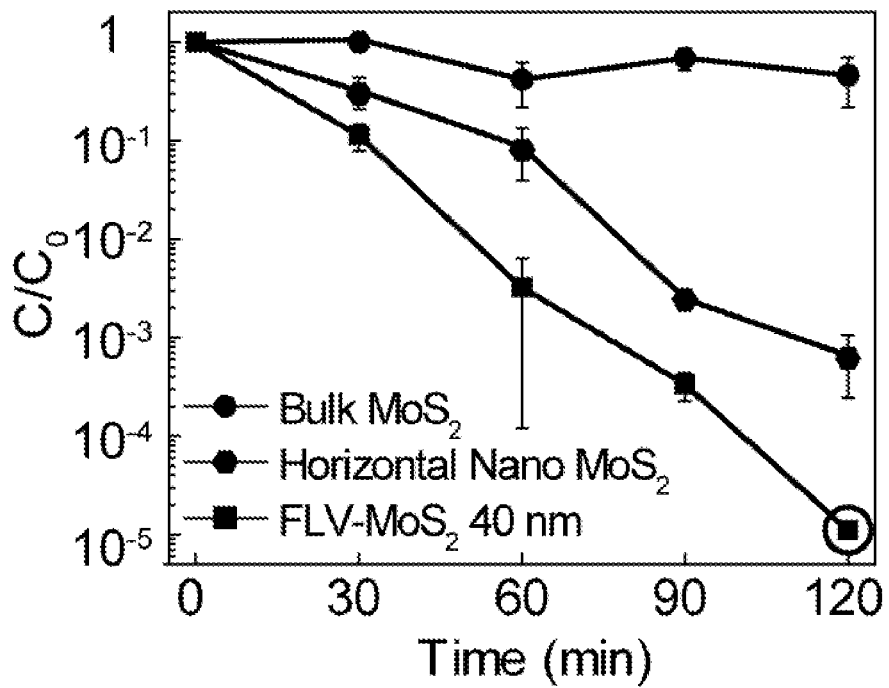
FIG. 3B shows disinfection performance of FLV—$MoS_2$ compared with horizontal nano $MoS_2$ and bulk $MoS_2$.
Figure 7:
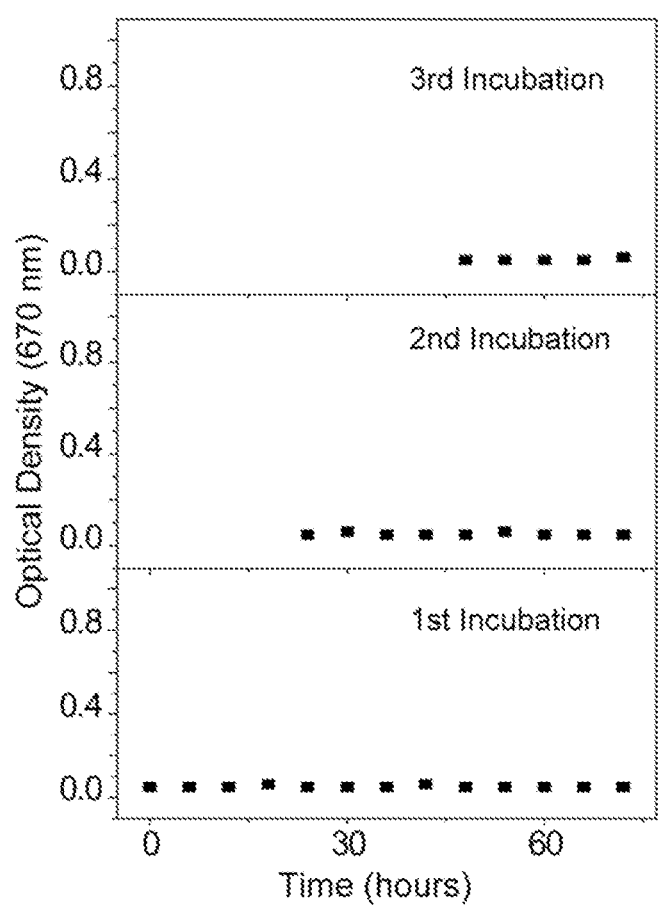
FIG. 7 shows results from a regrowth test of *E. coli* after photocatalytic water disinfection by FLV—MoS$_2$. The 1$^{st}$, 2$^{nd}$ and 3$^{rd}$ incubation indicates regrowth at 0 hour, 24 hours and 48 hours after photo disinfection experiment.
Figure 8A:
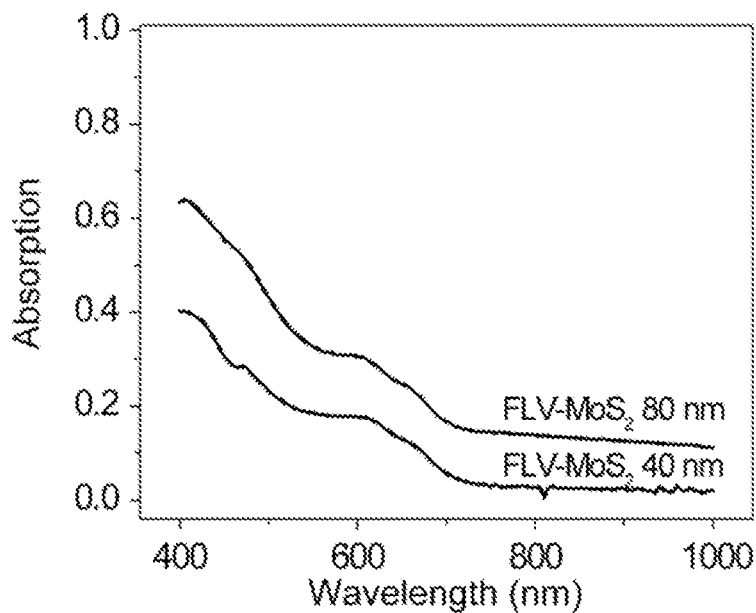
FIG. 8A shows absorption spectra of 40 nm and 80 nm FLV—MoS$_2$.
Figure 8B:
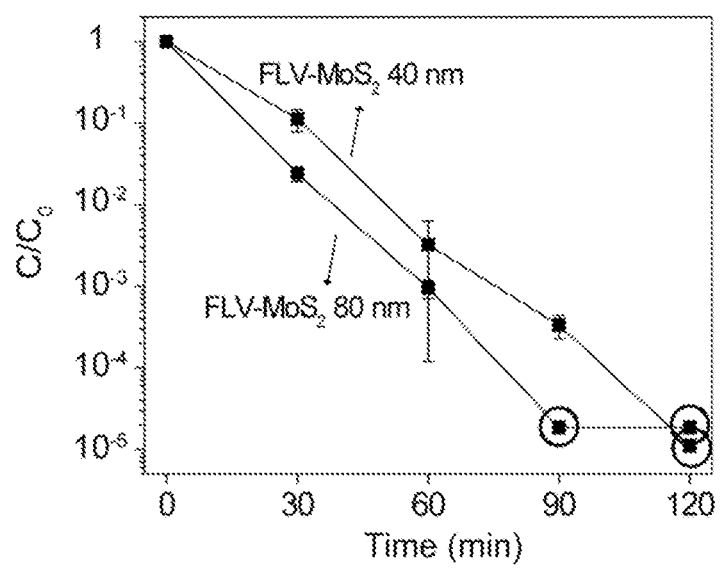
FIG. 8B is a comparison of disinfection performance between 40 nm and 80 nm FLV—MoS$_2$.

The photocatalytic disinfection performance of FLV—$MoS_2$ was then examined. Firstly, the photocatalytic effect of FLV—$MoS_2$ was confirmed by comparing the inactivation efficiencies of bacteria with FLV—$MoS_2$ under visible light (without UVA and UVB) to those of the controls consisting of FLV—$MoS_2$ incubated with bacteria in the dark and visible light illumination of the bacterial suspension without FLV—$MoS_2$. A solar simulator equipped with a UV-blocking filter was used as the light source. The Gram negative bacterium *Escherichia coli* was used as a process indicator in all experiments unless otherwise specified. Bacterial concentration at each time point of the experiment was normalized to the starting concentration at time 0 and the results are shown in FIG. 3A. Visible light alone or FLV—MoS$_2$ in the dark both showed <50% disinfection efficiency after 120 min while FLV—MoS$_2$ under visible light showed >99.999% *E. coli* inactivation in 120 min after which bacteria could not be detected and no recovery was observed (FIG. 7). The disinfection efficiency of FLV—MoS$_2$ was also compared to that of an equal mass of bulk MoS$_2$ (suspended flakes of ~2 μm) under the same experimental condition (FIG. 3B). Bulk MoS$_2$ showed 54% efficiency over 120 min which is much lower than that of FLV—MoS$_2$ of >99.999%. This suggests that decreasing the size of MoS$_2$ to only few layers (~2-6 nm thick) can increase the photocatalyst properties of MoS$_2$. Decreasing the layer thickness of MoS$_2$ increases ROS generation due to both the bandgap widening and diffusion distance shortening for electrons and holes to material surface. Also, the disinfection performance was compared between equal mass of FLV—MoS$_2$ and horizontal MoS$_2$ film (FIG. 3B). The horizontal MoS$_2$ film was made of stacked MoS$_2$ nano flakes with each flake 1-6 nm in thickness. Since both samples have larger bandgap than bulk MoS$_2$, the disinfection rates were much higher. Between the FLV—MoS$_2$ and horizontal MoS$_2$, the vertical direction configuration gave higher disinfection rate. This could be owing to a higher in-plane conductivity of electron/hole in MoS$_2$ and also more active edge sites exposed on the FLV—MoS$_2$ film.

Figure 3C:
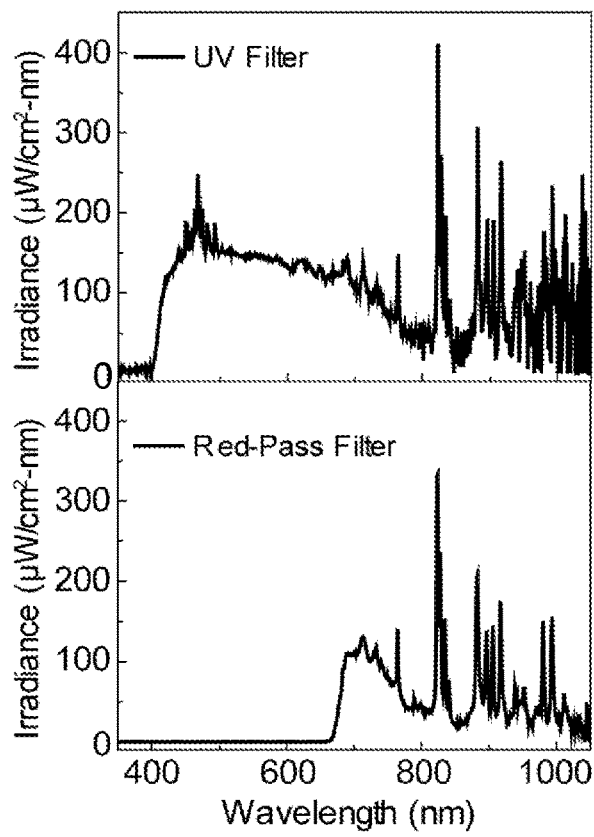
FIG. 3C shows spectrums of illuminating light sources, solar simulator with UV filter (top) and solar simulator with red-pass filter (bottom).
Figure 3D:
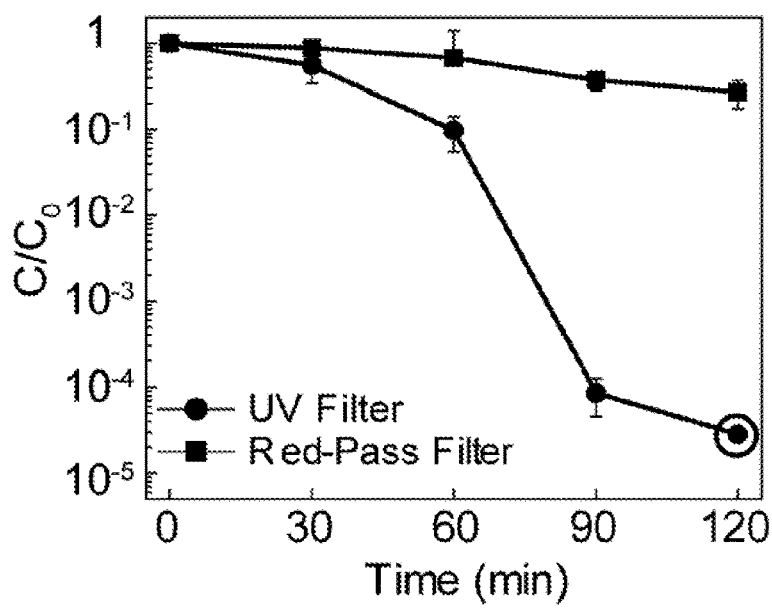
FIG. 3D shows disinfection performance using different light sources.
Figure 9A:
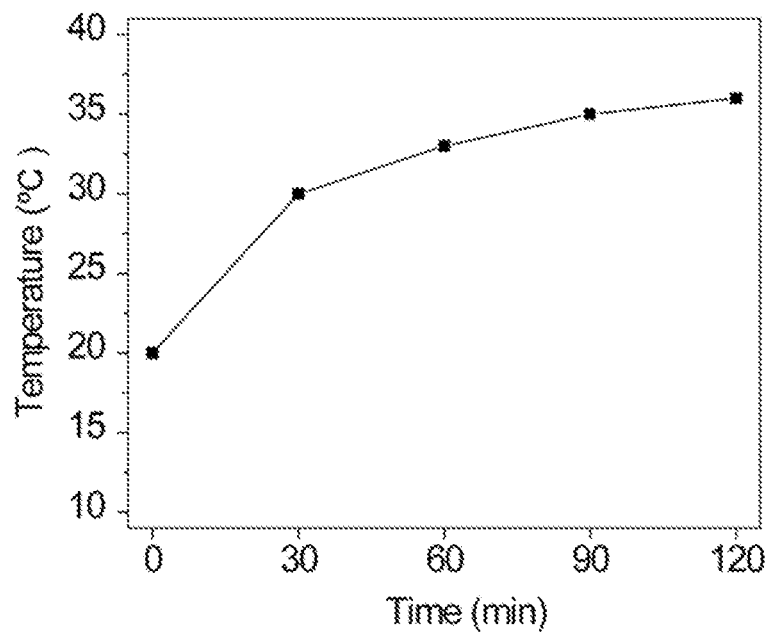
FIG. 9A shows temperature change with time during photocatalytic experiment.
Figure 9B:
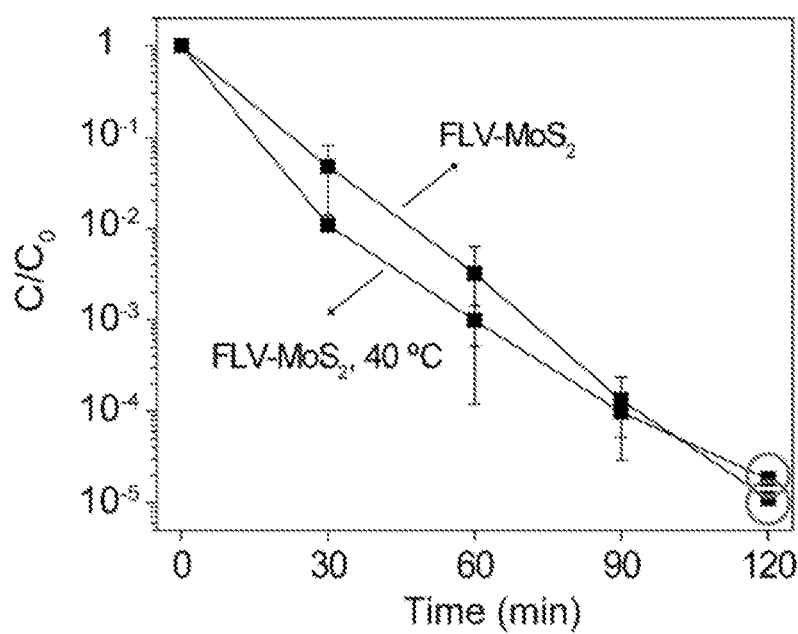
FIG. 9B shows disinfection performance of FLV—MoS$_2$ at constant temperature of 40° C.
Figure 10:
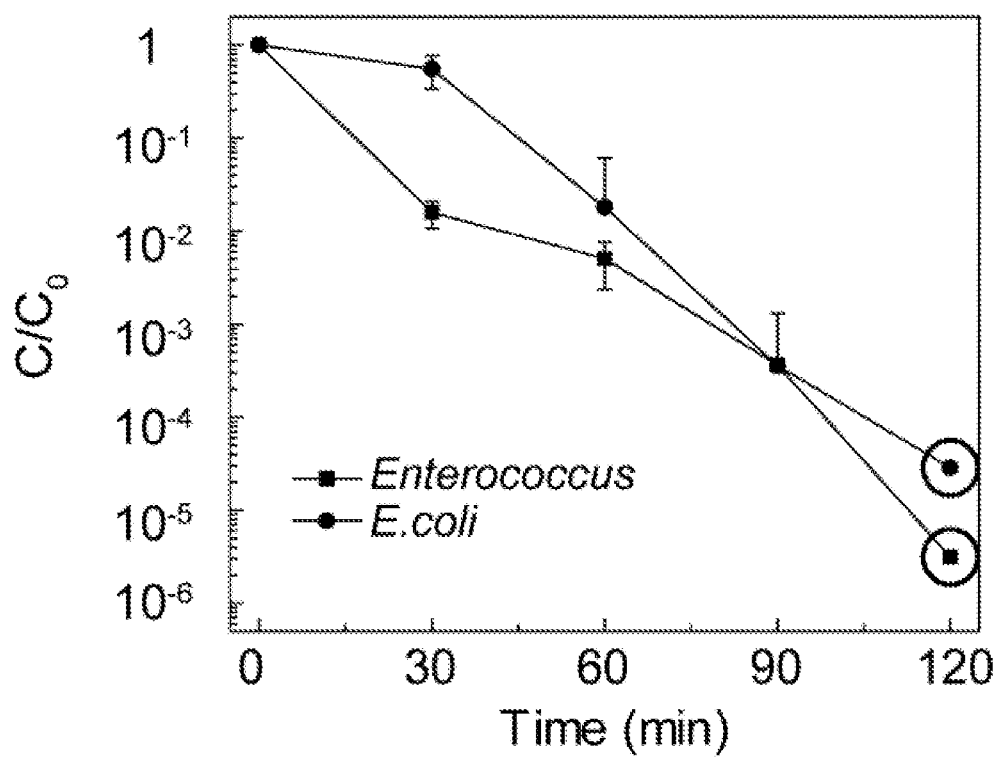
FIG. 10 shows disinfection performance of FLV—MoS$_2$ to both *E. coli* and *Enterococcus* under visible light illumination.
Figure 11A:
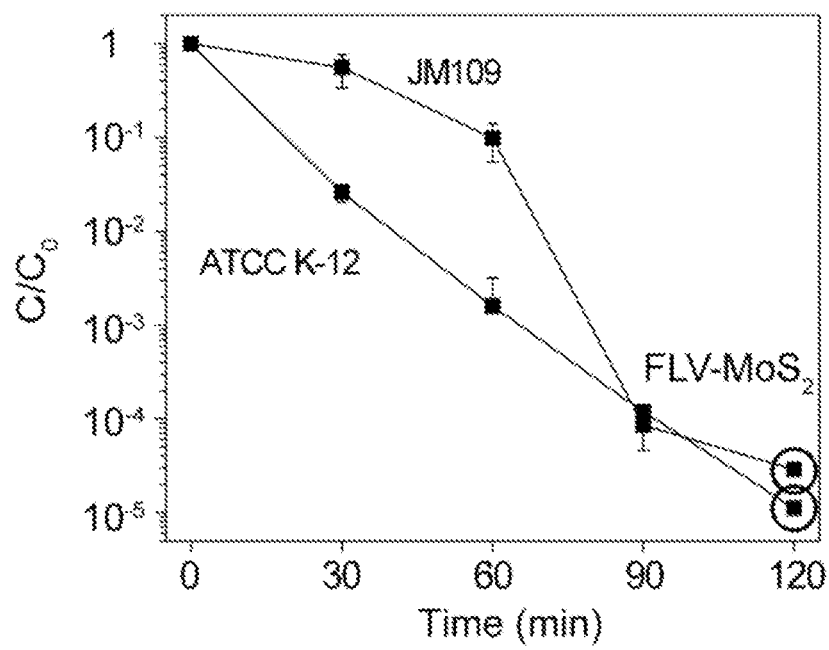
FIG. 11A shows photocatalytic disinfection performance comparison between different *E. coli* strains JM109 and ATCC K-12 using FLV—MoS$_2$.
Figure 11B:
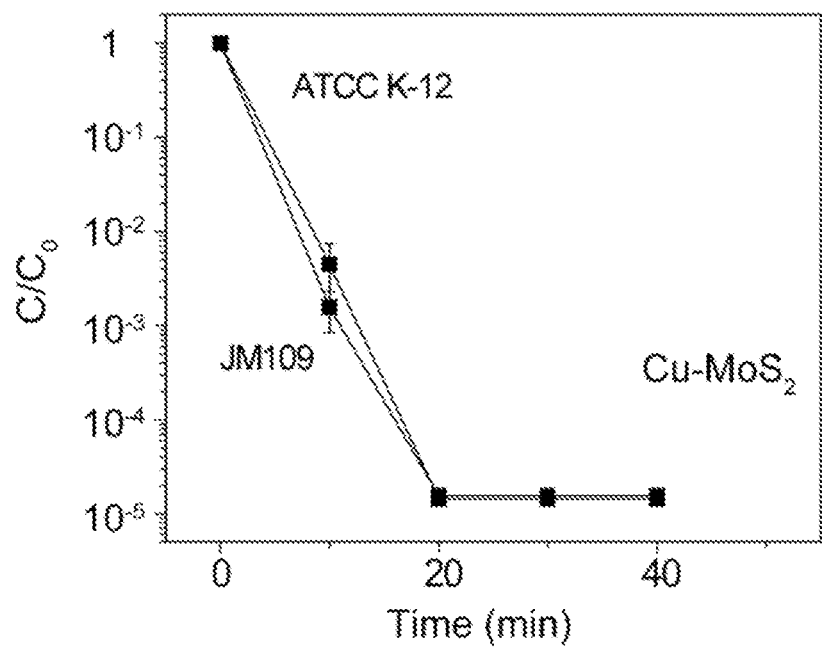
FIG. 11B shows photocatalytic disinfection performance comparison between different *E. coli* strains JM109 and ATCC K-12 using Cu—MoS$_2$.

To eliminate the thermal effect potentially caused by infrared (IR) light, the disinfection efficiency of *E. coli* in water with FLV—MoS$_2$ under visible light combined with IR light and under only IR light was compared. The light spectrum is shown in FIG. 3C and the disinfection performance is shown in FIG. 3D. With IR light alone, the disinfection efficiency (83%) was much less than that of visible light combined with IR light together (>99.999%). Additionally, a temperature control experiment also eliminated the thermal effect (FIGS. 9A-B). Therefore it is confirmed that visible light photocatalysis instead of thermal effect induces most of the disinfection. The disinfection effect of FLV—MoS$_2$ on a model Gram positive bacterium, *Enterococcus faecalis*, and another strain of *E. coli* was also demonstrated. No live bacteria was detected after 120 min of illumination (FIG. 10 and FIGS. 11A-B). This suggests that FLV—MoS$_2$ can be used to inactivate a variety of bacteria.

Figure 3E:
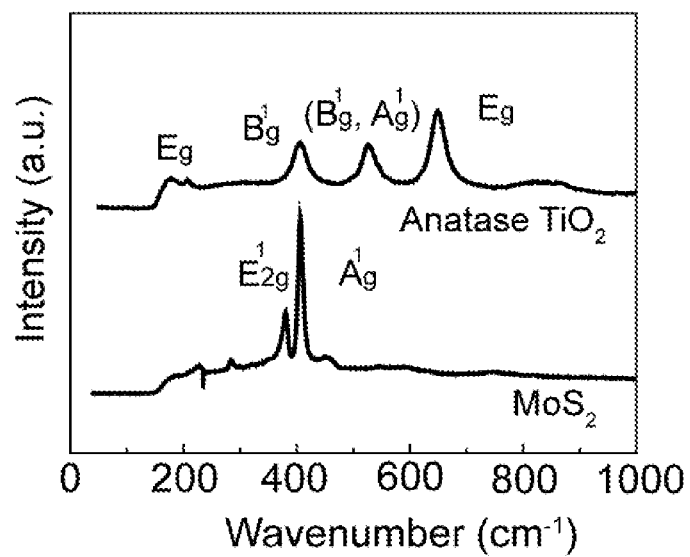
FIG. 3E shows Raman spectra of FLV—$MoS_2$ and $TiO_2$ films.
Figure 3F:
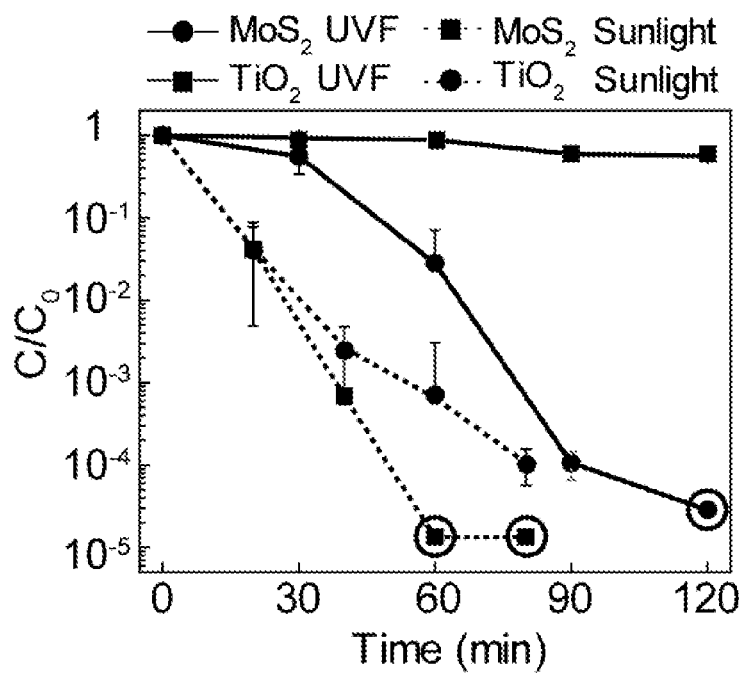
FIG. 3F is a comparison of disinfection performance between FLV—MoS$_2$ and TiO$_2$ films under both visible light and real sunlight illumination.
Figure 12:
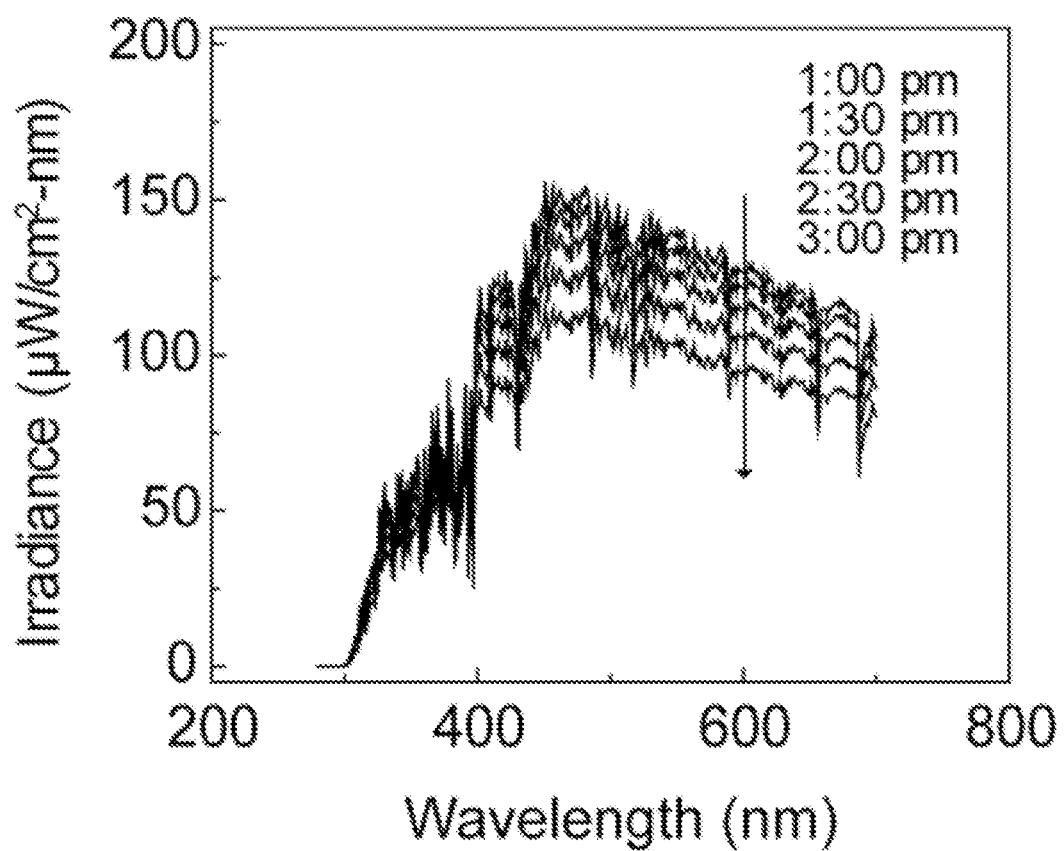
FIG. 12 shows real sunlight spectrums on Mar. 30, 2013 at Stanford experiment site estimated by SMARTS (from 1:00 pm to 3:00 pm).
Figure 13A:
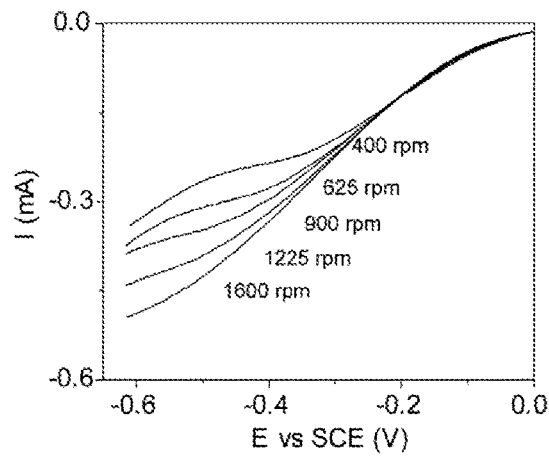
FIG. 13A shows ORR polarization curves of Cu on glassy carbon rotating disk electrodes in O$_2$ saturated 0.5 M Na$_2$SO$_4$ solution at various rotation rates.
Figure 13B:
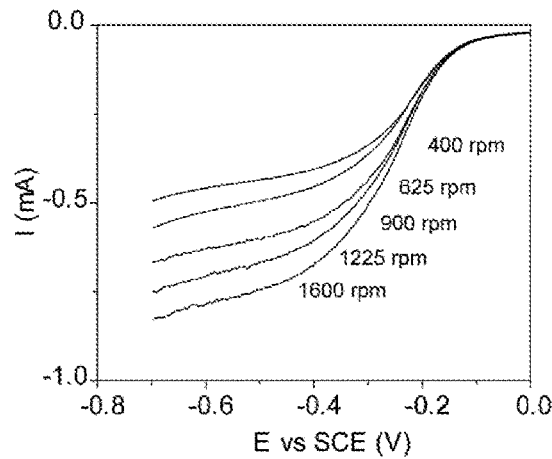
FIG. 13B shows ORR polarization curves of Au on glassy carbon rotating disk electrodes in O$_2$ saturated 0.5 M Na$_2$SO$_4$ solution at various rotation rates.
Figure 13C:
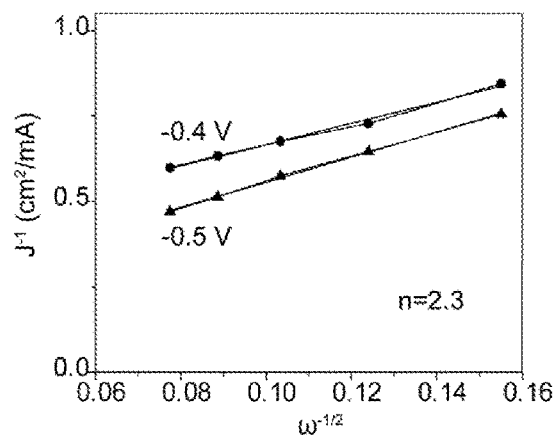
FIG. 13C shows Koutecky-Levich plots of Cu corresponding to FIG. 13A at different potentials. The n number is the electron transfer number during ORR reduction reactions.
Figure 13D:
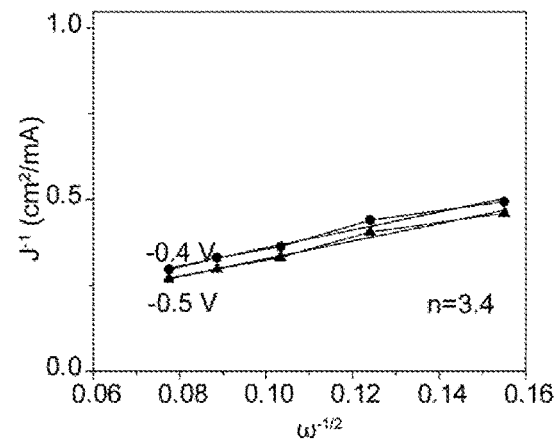
FIG. 13D shows Koutecky-Levich plots of Au corresponding to FIG. 13B at different potentials. The n number is the electron transfer number during ORR reduction reactions.
Figure 17A:
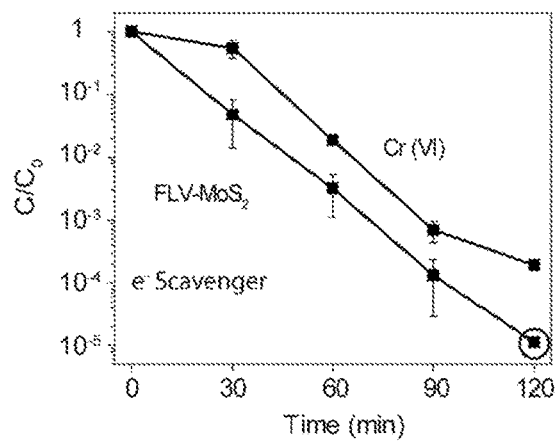
FIG. 17A shows photocatalytic disinfection performance of FLV—MoS$_2$ with scavenger sodium chromate to quench photo generated e$^-$.
Figure 17B:
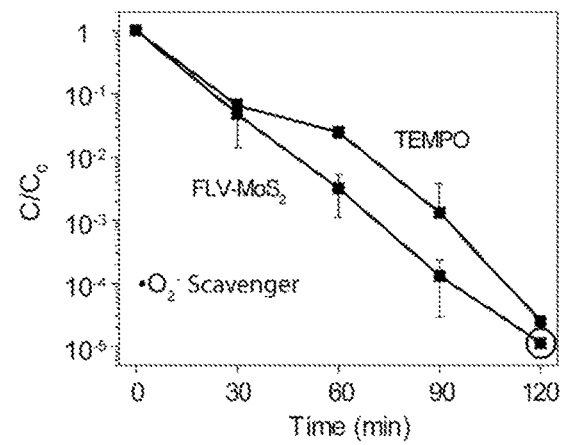
FIG. 17B shows photocatalytic disinfection performance of FLV—MoS$_2$ with scavenger TEMPO to quench photo generated ·O$_2^-$.
Figure 17C:
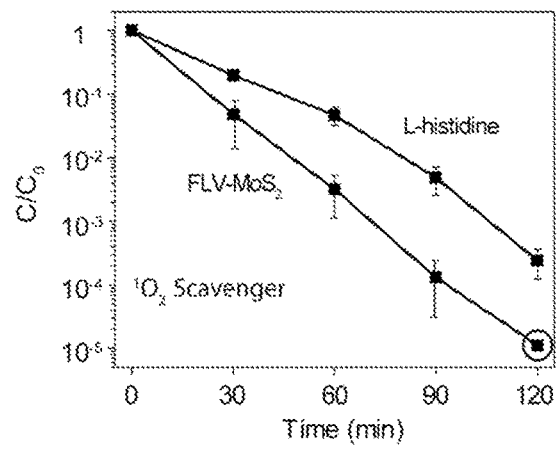
FIG. 17C shows photocatalytic disinfection performance of FLV—MoS$_2$ with scavenger L-histidine to quench photo generated $^1$O$_2$.
Figure 17D:
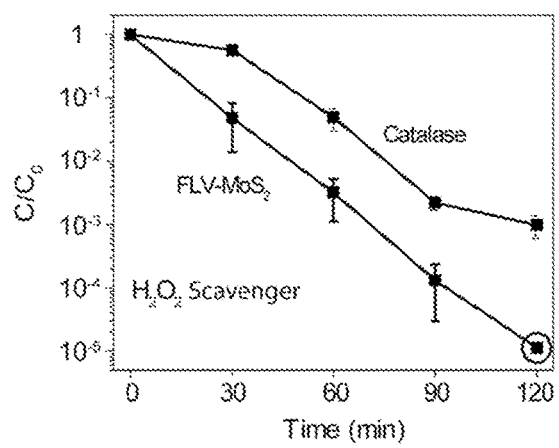
FIG. 17D shows photocatalytic disinfection performance of FLV—MoS$_2$ with scavenger catalase to quench photo generated H$_2$O$_2$.
Figure 18C:
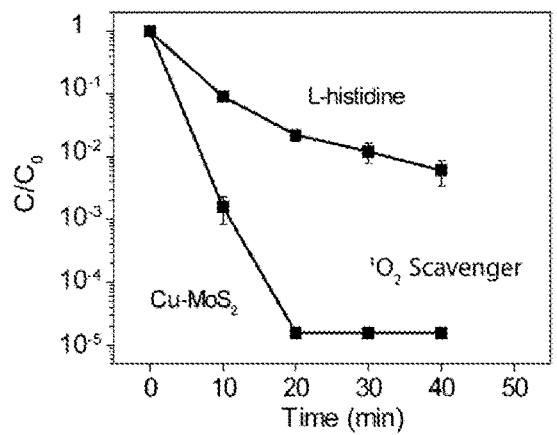
FIG. 18C shows photocatalytic disinfection performance of Cu—MoS$_2$ with scavenger L-histidine to quench photo generated $^1$O$_2$.
Figure 18D:
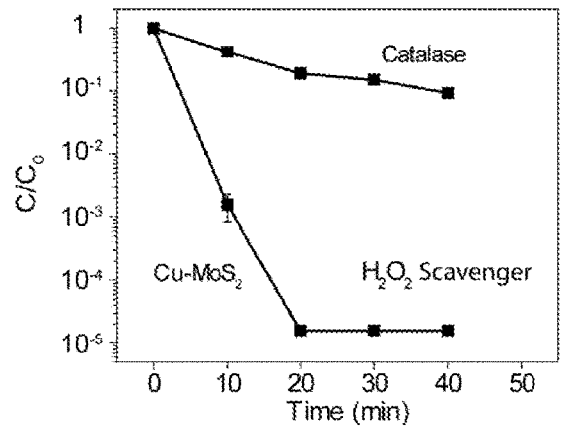
FIG. 18D shows photocatalytic disinfection performance of Cu—MoS$_2$ with scavenger catalase to quench photo generated H$_2$O$_2$.
Figure 18E:
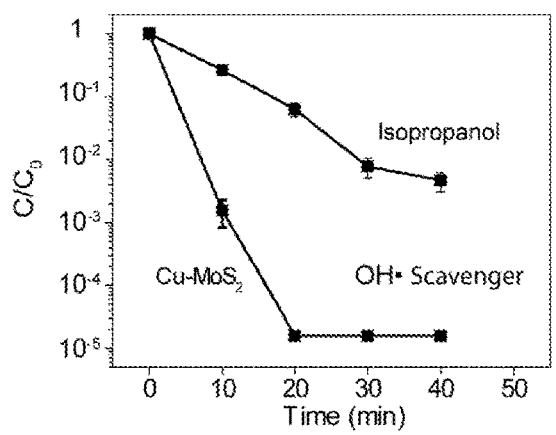
FIG. 18E shows photocatalytic disinfection performance of Cu—MoS$_2$ with scavenger isopropanol to quench photo generated OH·.
Figure 18F:
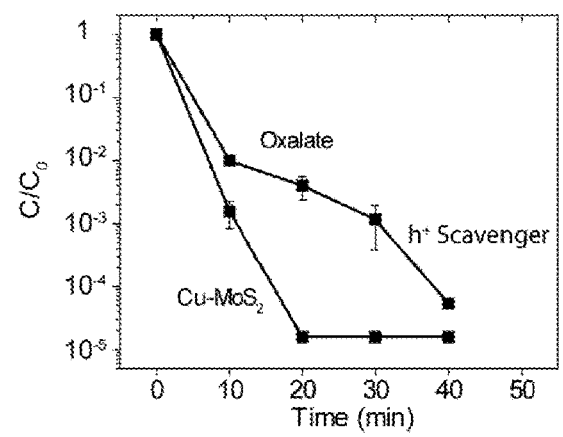
FIG. 18F shows photocatalytic disinfection performance of Cu—MoS$_2$ with scavenger sodium oxalate to quench photo generated h$^+$.

The disinfection performance of FLV—MoS$_2$ was compared with the well-studied photocatalyst TiO$_2$. TiO$_2$ film was grown through atomic layer deposition method following an annealing process. The thickness of TiO$_2$ was kept the same as FLV—MoS$_2$. The Raman spectroscopy of both FLV—MoS$_2$ and TiO$_2$ are shown in FIG. 3E and TiO$_2$ was confirmed to be in anatase phase. The comparison of disinfection performances of FLV—MoS$_2$ and TiO$_2$ are shown in FIG. 3F. Due to the large 3.2 eV bandgap of TiO$_2$ (corresponding to light wavelength of 387 nm), illumination under the solar spectrum with UV light filter did not induce any photocatalytic ROS generation. Hence *E. coli* concentration just decreased 44% after 120 min of illumination which is similar to that of the light control. This confirms that TiO$_2$ was unable to harvest visible light for photocatalytic water disinfection. Using real sunlight as the light source (13:00 local time, Mar. 30, 2013, Stanford, Calif., USA; spectrum is in FIG. 12), the disinfection performance of FLV—MoS$_2$ and TiO$_2$ were also compared (FIG. 3F). FLV—MoS$_2$ showed 5 log inactivation of bacteria concentration (>99.999% inactivation efficiency) and no live bacteria was detected within 60 min of real sunlight illumination. This gives a first order disinfection rate of 0.18 min$^{-1}$ (R$^2$=0.99) for FLV—MoS$_2$ under real sunlight. TiO$_2$ showed a log inactivation efficiency of 3 log (99.9%) in 60 min corresponding to a disinfection rate of 0.12 min$^{-1}$ (R$^2$=0.96). Thus, the photocatalytic effect of FLV—MoS$_2$ was much better than TiO$_2$ for *E. coli* disinfection under both visible light and real sunlight.

A4) Disinfection Performance Enhanced by Additional Catalysts.

Normally, the performance of a photocatalyst is governed by two important properties which are 1) the utilization of solar spectrum by the semiconductor photocatalyst and 2) the efficacy of the generated electron-hole pairs for ROS production. For the second property, there is competition between the generated electrons and holes to produce ROS and other physical processes such as electron-hole recombination, trapping in the material during diffusion, as well as participating in other reactions (such as hydrogen evolution, oxygen reduction and oxidation). Semiconductor materials are usually nonspecific in catalyzing ROS production. Hence to promote the production of ROS, addition of catalysts is important. Nano-sized noble metals can be used to decorate the semiconductor material surface to serve as ROS catalysts and to form metal-semiconductor junctions to enhance the electron hole separation. It has been shown in the literature that addition of nano sized noble metals to a TiO$_2$ catalyst can dramatically increase ROS production.

Figure 4A:
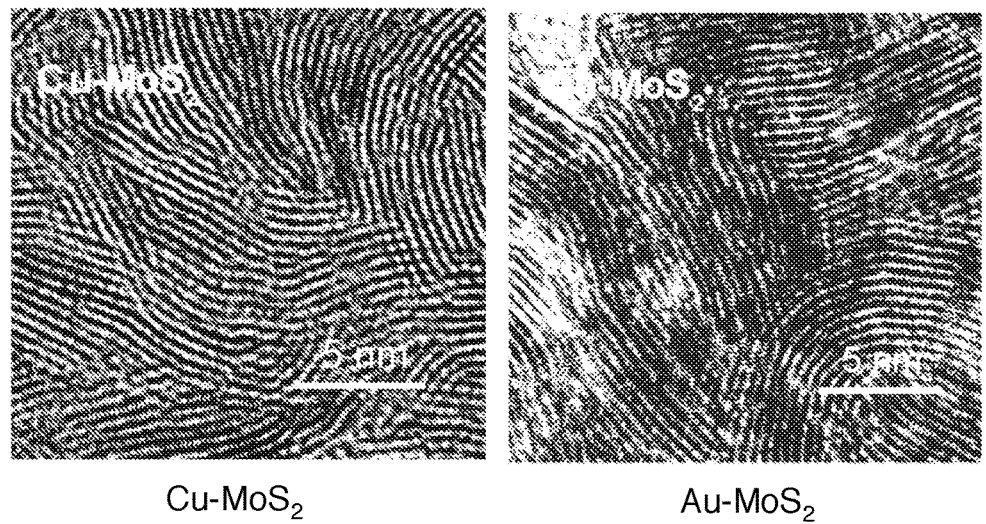
FIG. 4A is a top view TEM image showing the morphology of Cu—MoS$_2$ and Au—MoS$_2$ after deposition.
Figure 4B:
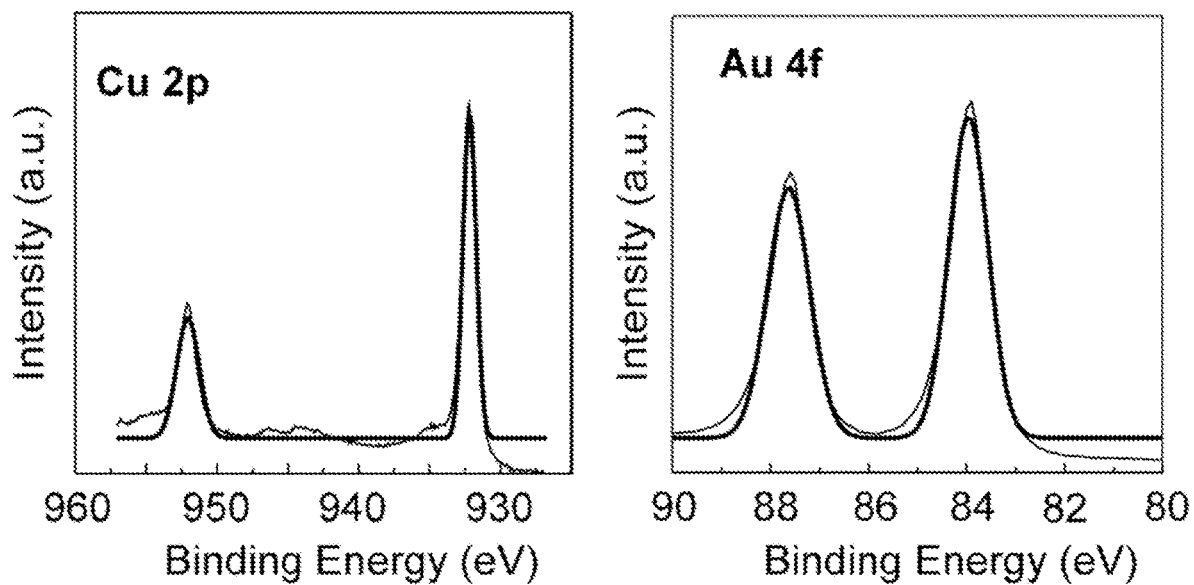
FIG. 4B shows XPS characterization of Cu—MoS$_2$ and Au—MoS$_2$ showing the presence of Cu and Au.
Figure 4C:
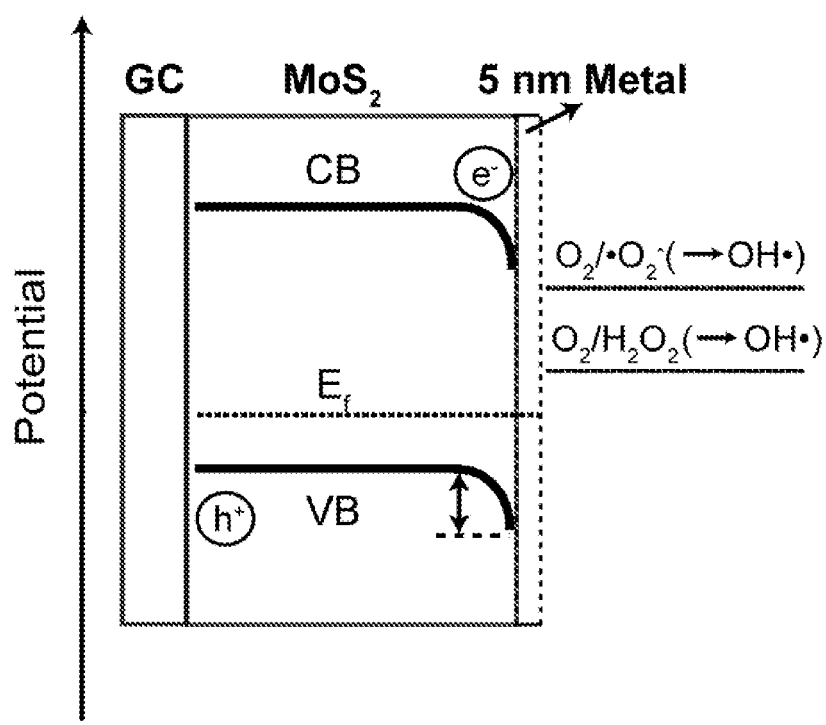
FIG. 4C is a schematic showing the enhancement of electron-hole separation to facilitate the electrons to participate in ROSs generation reactions after Cu/Au deposition.
Figure 4D:
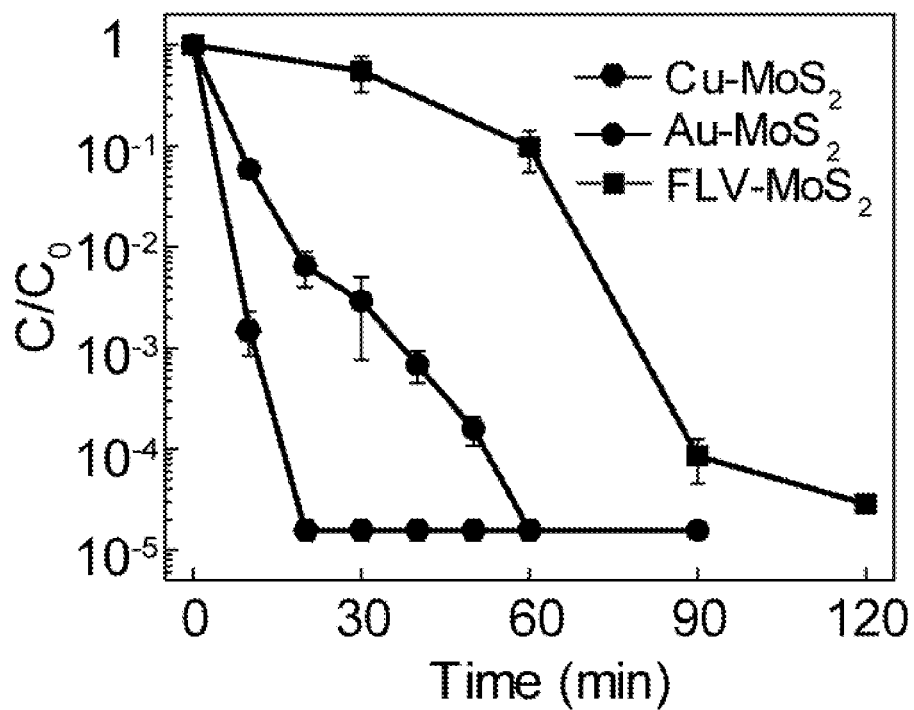
FIG. 4D is a disinfection performance comparison of Cu—MoS$_2$ and Au—MoS$_2$ to pristine FLV—MoS$_2$ showing the rapid disinfection by Cu—MoS$_2$ and Au—MoS$_2$ after deposition of catalysts.

To accelerate the photocatalytic disinfection rate, 5 nm of Cu or Au was deposited onto the FLV—MoS$_2$ to catalyze ROS generation and also improve electron-hole pair separation. Cu and Au are good catalysts for ROS generation and they preferentially catalyze two electron oxygen reduction reaction for H$_2$O$_2$ generation over a four electron transfer reaction (FIGS. 13A-D). Cu and Au are deposited via thermal evaporation process. The morphologies of as-grown Cu—MoS$_2$ and Au—MoS$_2$ were characterized by TEM and scanning electron microscopy (SEM) and the images are shown in FIG. 4A and FIGS. 14A-B. The thermal evaporation process did not change the morphology of MoS$_2$ film. No obvious intercalation of Cu or Au were observed because the layer spacing was ~0.63 nm and ~0.62 nm for Cu—MoS$_2$ and Au—MoS$_2$,respectively, which is similar to pristine FLV—MoS$_2$ of ~0.60 nm (FIG. 15). The existence of Cu and Au film was confirmed by X-ray photoelectron spectroscopy (XPS) (FIG. 4B). The XPS data showed signature peaks for Cu 2 p$_{3/2}$ at 932.6 eV and for Au 4 f$_{7/2}$ at 83.9 eV. Besides the catalytic effect, Cu and Au can also increase the separation of electron-hole pairs. The work function of Cu and Au is 4.7 eV and 5.1 eV, respectively. When in contact with p-type FLV—MoS$_2$, the Schottky junction facilitates the electron migration to Cu or Au surface and participate in oxygen reduction reactions to produce ROS as schematically shown on FIG. 4C. This should further promote the oxygen reduction reaction for ROS generation. The disinfection performances of Cu—MoS$_2$ and Au—MoS$_2$ are shown in FIG. 4D. A solar simulator with a UV light filter was used as light source as in the disinfection experiments. For FLV—MoS$_2$ without any catalyst, after 120 min of illumination, no live *E. coli* was detected. With 5 nm of Cu, the disinfection rate was enhanced and within only 20 min, no live bacteria was detected, which is equivalent to a disinfection efficiency of >99.999%. For the Au—MoS$_2$, the illumination time to achieve >99.999% disinfection efficiency was also shortened relative to FLV—MoS$_2$ to 60 min. The disinfection rate for Cu—MoS$_2$ and Au—MoS$_2$ was 0.57 min$^{-1}$ (R$^2$=0.99) and 0.19 min$^{-1}$ (R$^2$=0.96), respectively, under solar simulator with UV light filter. It is much faster compared to FLV—MoS$_2$ of 0.087 min$^{-1}$ (R$^2$=0.99). The disinfection enhancement confirmed the efficacy of Cu and Au to separate electron-hole pair more efficiently and catalyze the oxygen reduction reactions for ROS generation. With Cu and Au as catalysts the disinfection rate is enhanced 6 fold and 2 fold, respectively. After photocatalytic disinfection experiment, the concentration of Cu or Au was measured. No detectable Au was present in water sample and Cu concentration was 3.25 ppb (μg/L) which is <1% the Cu catalyst mass loading.

A5) Photocatalytic Disinfection Mechanism.

Figure 19A:
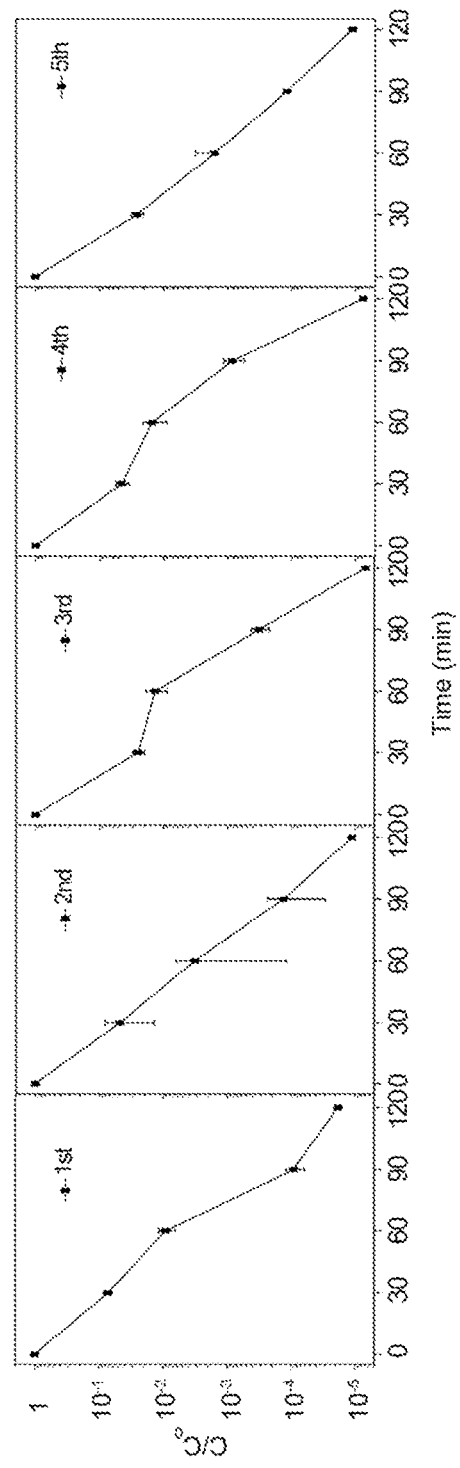
FIG. 19A shows photocatalytic disinfection performance of FLV—MoS$_2$ continuously used for 5 cycles.
Figure 19B:
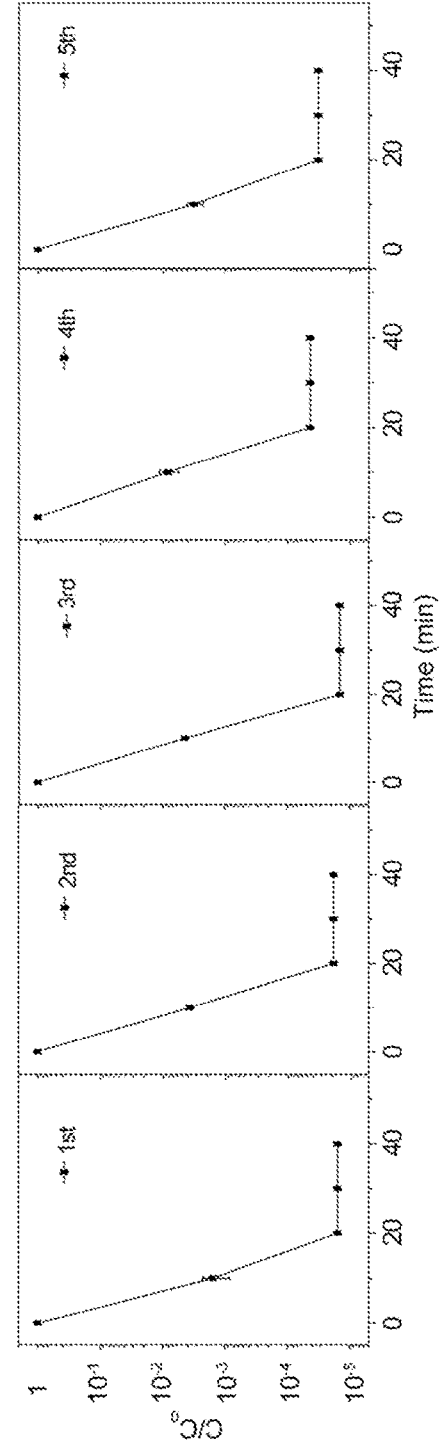
FIG. 19B shows photocatalytic disinfection performance of Cu—MoS$_2$ continuously used for 5 cycles.

Furthermore, to directly prove the disinfection mechanism by ROS in FLV—MoS$_2$ and Cu—MoS$_2$ systems and also to prove the catalytic effect of Cu, ROS concentrations in both systems were measured and a series of ROS scavenging experiments were conducted. The results are shown in FIGS. 16A-D, 17A-F, 18A-F and 19A-B and are described in greater detail in section B below. It is shown that four ROS (O$_2^-$, $^1$O$_2$, H$_2$O$_2$ and OH·) were present in both FLV—MoS$_2$ and Cu—MoS$_2$ system with concentration of H$_2$O$_2$>·O$_2^-$>$^1$O$_2$>OH·. Moreover, for each ROS, the concentration in Cu—MoS$_2$ system is higher than that in FLV—MoS$_2$ system. This is consistent with the fact that Cu—MoS$_2$ demonstrated a higher disinfection rate and also proves the effectiveness of Cu in catalyzing ROS generation. Six scavenger quenching experiments were conducted to study the disinfection contribution of each ROS as well as electron and hole. The results suggested that H$_2$O$_2$ has the strongest effect in inactivating bacteria and oxygen reduction related ROS dominates the disinfection effect. All these results are consistent with the band structure of MoS$_2$ which favors the oxygen reduction to produce ROS. Besides, the FLV—MoS$_2$ and Cu—MoS$_2$ were proven to be stable after multi-cycle tests (FIGS. 19A-B).

Figure 4E:
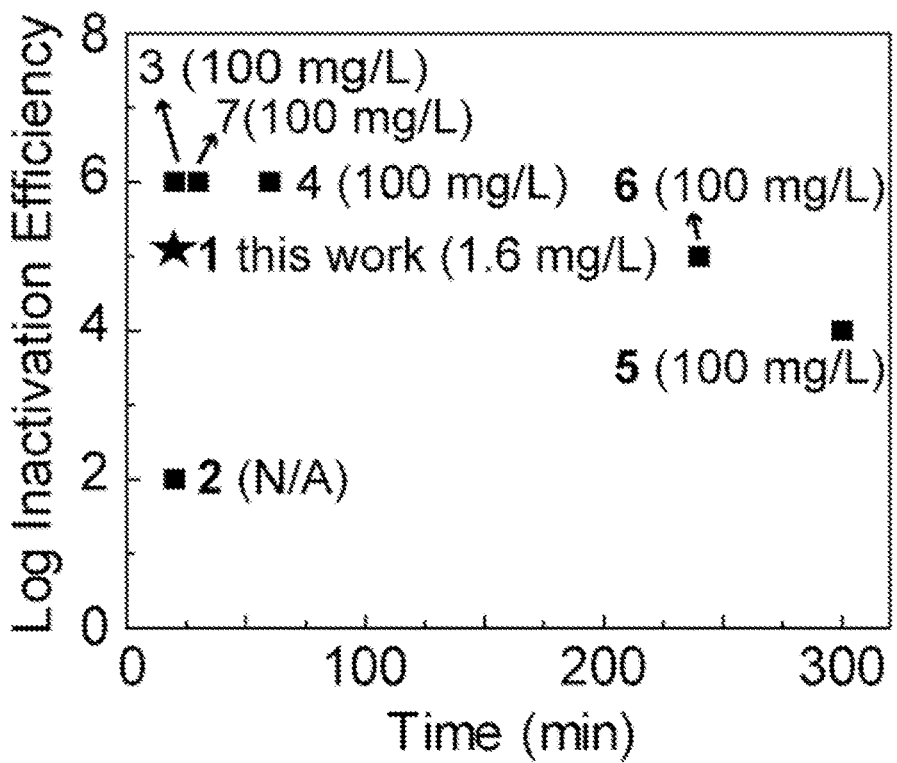
FIG. 4E is a Disinfection performance comparison of Cu—MoS$_2$ with other photocatalysts using *E. coli* from the literature. Plot shows the log inactivation of *E. coli* with respect to illumination time for all photocatalysts in comparison. Further details are given in Table 1. The final inactivation efficiencies are limited by the initial bacterial concentration.

The bacterial disinfection performance of Cu—MoS$_2$, with disinfection rate of 0.57 min$^{-1}$ (R$^2$=0.99), under solar simulator with a UV filter is so far among the best based on a review of the literature in terms of speed and log reduction in bacterial concentration (FIG. 4E and Table 1). Compared with those achieving total disinfection (no live bacteria detected) within 30 min, such as ZnO/Cu, GO—CdS and SGO—ZnO—Ag, the material mass loading used in the case of Cu—MoS$_2$ is ~60 times less than the others. On the other hand, for fixed photocatalysts grown on substrates with similar material mass loading such as TiO$_2$—CdS, the disinfection rate of Cu—MoS$_2$ (>99.999%) is much faster than that of TiO$_2$—CdS (~90%) in 20 min. Hence Cu—MoS$_2$ shows a great advantage as a new effective visible light photocatalyst for water disinfection.

TABLE 1

Details for photocatalytic disinfection experiment conditions in comparison of FIG. 4E (sample concentration, light source and intensity, and bacteria strain). Line 1 relates to this work, while lines 2-7 are reported results from the literature.

| | Sample | Size or Concentration | Light Wavelength & Intensity | Bacteria Strain |
|---|---|---|---|---|
| 1 | Cu—MoS$_2$ | 2 cm$^2$ film (1.6 mg/L) | >400 nm, 100 mW/cm$^2$ | E. coli, K-12/ E. coli JM109 |
| 2 | TiO$_2$—CdS | 1 cm$^2$ film | Xenon, 150 mW/cm$^2$ | E. coli, XL1 Blue |
| 3 | ZnO—Cu | 100 mg/L | >400 nm, 100 mW/cm$^2$ | E. coli, ATCC 8739 |
| 4 | GO-CdS | 100 mg/L | >420 nm, 100 mW/cm$^2$ | E. coli, K-12 |
| 5 | BV | 100 mg/L | >400 nm, 193 mW/cm$^2$ | E. coli, K-12 |
| 6 | GO-C$_3$N$_4$ | 100 mg/L | >400 nm, 193 mW/cm$^2$ | E. coli, K-12 |
| 7 | SGO-ZnO—Ag | 100 mg/L | >420 nm, 100 mW/cm$^2$ | E. coli, K-12 |

A6) Conclusion

We demonstrated efficient harvesting of visible light for photocatalytic water disinfection with a novel material, FLV—MoS$_2$. By decreasing the domain size, the bandgap of MoS$_2$ was increased from 1.3 eV (bulk material) to 1.55 eV (FLV—MoS$_2$). It enabled the FLV—MoS$_2$ to successfully generate ROS for bacteria inactivation in water. The FLV—MoS$_2$ showed faster disinfection than most studied TiO$_2$. With additional deposition of Cu and Au to assist electron-hole pair separation and also catalyze ROSs production reactions, FLV—MoS$_2$ showed rapid inactivation of >99.999% bacteria in only 20 min and 60 min, respectively. The promising performance of FLV—MoS$_2$ and Cu—MoS$_2$ on bacteria shows great potential for them as photocatalyst for visible light pathogen (bacteria, viruses and protozoa) inactivation in water.

A7) Methods

A7a) FLV—MoS$_2$ Growth.

Edge-terminated MoS$_2$ films are grown inside a single-zone, 12-in. horizontal tube furnace (Lindberg/Blue M) equipped with a 1-in.-diameter quartz tube. For 40 nm FLV—MoS$_2$ film, the substrates (1 cm×2 cm) were sputtered with 10-nm-thick Mo film as a precursor and then sulfurization at a base pressure of 100 mTorr Ar environment. The tube furnace was quickly raised to reaction temperature of 500° C. in 20 min and kept at 500 for 10 min for reaction.

A7b) Disinfection Performance.

Bacteria, *Escherichia coli* (JM109, Promega and ATCC K-12) and *Enterococcus faecalis* (ATCC 19433), were cultured to log phase, harvested by centrifugation at 900×g, washed twice with DI water and suspended in DI water to ~10$^6$ CFU/mL. Photocatalytic disinfection was performed using solar simulator (Newport) calibrated as AM1.5 (100 mW/cm$^2$) as light source and UV filter (Clarex) and red-pass filter (Clarex NIR-70) to tune the light spectrum. FLV—MoS$_2$ sample size is 1 cm×2 cm×40 nm and water volume is 25 mL. Bacterial concentrations were measured at different time of illumination using standard spread plating techniques. Each sample was serially diluted and each dilution was plated in triplicate onto trypticase soy agar and incubated at 37° C. for 18 h. The solar disinfection performance experiments were conducted in duplicate. The light spectrums (solar simulator with UV filter or solar simulator with red-pass filter) were measured at the same place where the sample was set during the disinfection experiment. The solar spectrum during the real sunlight experiment was estimated using simple model of the atmospheric radiative transfer of sunshine (SMARTS). Disinfection rates (k) were estimated using Chicks law: $\ln(C/C_0) = -kt$ where k is in units of per time, C is the concentration of bacteria and $C_0$ is the concentration at t=0 of the experiments. The slope of the best fit line to $\ln(C/C_0)$ versus t for each experiment was used to estimate k.

A7c) Material Characterization.

Characterizations were carried out using TEM (aberration-corrected FEI 80-300 environmental Titan (S) TEM microscope at 300 keV), Raman spectroscopy (WITEC Raman spectrometer), X-ray photoelectron spectroscopy (XPS, SSI SProbe XPS spectrometer with Al (Ka) source), scanning electron microscopy (SEM, FEI Nova NanoSEM 450), and scanning Kelvin probe (KP Technology Model 5050). The absorption measurement was using a xenon lamp (69911, Newport) as the light source coupled with a monochromator (74125, Newport).

B) Supplemental Material

B1) Discussion on ROS disinfection mechanism.

All four types of ROSs were present in both FLV—$MoS_2$ and Cu—$MoS_2$ systems and all four ROSs were of higher concentration in the Cu—$MoS_2$ system than FLV—$MoS_2$. This is consistent with the fact that Cu—$MoS_2$ had faster disinfection rate than FLV—$MoS_2$. The concentrations measured in each system represent the concentration in the bulk solution phase, while the concentration of ROS at the vicinity of Cu—$MoS_2$ or FLV—$MoS_2$ could be much higher. Also, the band structure of FLV—$MoS_2$ suggested that ROS from oxygen reduction related reactions ($\cdot O_2^-$ and $H_2O_2$) would occur more easily, and the measured concentrations of $\cdot O_2^-$ and $H_2O_2$ are indeed higher than the other two types of ROS in both FLV—$MoS_2$ and Cu—$MoS_2$ system.

Due to the oxidative strength difference, the disinfection capability of each ROS was investigated through scavenger quenching experiments in FIGS. 17A-F and 18A-F. Scavengers Cr (VI), TEMPO, L-histidine, catalase, isopropanol and sodium oxalate were used to quench $e^-$, $\cdot O_2^-$, $^1O_2$, $H_2O_2$, $OH \cdot$ and $h^+$, respectively. The scavenging effect from high to low in the FLV—$MoS_2$ system according to the reaction rate is catalase (for $H_2O_2$), L-histidine (for $^1O_2$), Cr (VI) (for $e^-$), TEMPO (for $\cdot O_2^-$), isopropanol (for $OH \cdot$), followed by oxalate (for $h^+$). This result is consistent with the ROS concentration measurement that ORR related ROS played a critical role in the inactivation of bacteria. $H_2O_2$, which showed significantly higher concentration than other ROSs, also showed the highest contribution in inactivating bacteria. $h^+$ did not show much inactivation effect since no slowing down of bacterial inactivation rate was observed. This could be due to the fast recombination of electron-hole pairs. Also it is possible that quenching of $h^+$ could promote $e^-$ and related ROS generation so that the overall disinfection rate did not change much.

For the scavenger quenching results in the Cu—$MoS_2$ system, the trend of ROS scavenging effect was similar to that of FLV—$MoS_2$, but the change in disinfection rate is more obvious. This result supports the higher ROS concentrations in the Cu—$MoS_2$ system compared to FLV—$MoS_2$. The scavenging effect from high to low in Cu—$MoS_2$ system is catalase (for $H_2O_2$), TEMPO (for $\cdot O_2^-$), L-histidine (for $^1O_2$), isopropanol (for $OH \cdot$), Cr (VI) (for $e^-$) and oxalate (for $h^+$). Still $H_2O_2$ contributes most to bacteria disinfection and ORR related ROS dominates the disinfection effect. The difference in the Cu—$MoS_2$ system comparing to FLV—$MoS_2$ system is that the scavenging effect of $h^+$ and $OH \cdot$ becomes more obvious in the Cu—$MoS_2$ system. This indicates that a better electron-hole pair separation was enabled by adding Cu as catalyst so that in the Cu—$MoS_2$ system, $h^+$ itself plays an important role in inactivating bacteria. Also, $h^+$-related generation of $^1O_2$ by reacting with $\cdot O_2^-$ is of higher concentration than that of FLV—$MoS_2$.

In summary, the ROS measurement and scavenging experiments proves that in both FLV—$MoS_2$ and Cu—$MoS_2$ system, ORR related ROS contributes most to the bacteria inactivation. With Cu as catalyst, the electron-hole separation was facilitated and the generation of ROS was enhanced.

B2) Methods

B2a) Regrowth Test

After photocatalytic disinfection experiment, the bacteria water solution was put in dark stirring at mild rate of 200 rpm. At 10 min, 24 hours and 48 hours after dark recovery, 5 mL of bacteria solution was added to a 30 mL TSB liquid medium and incubate at 37° C. on shake bed. The optical density at 670 nm was monitored each 6 hours.

B2b) ROS Measurements $^1O_2$ steady state concentration was calculated by measuring the decay of furfuryl alcohol (FFA) (Sigma, 98%) using High Performance Liquid Chromatography (HPLC, Agilent 1260 Infinity) with an Inertsil ODS-3 column (250 mm×4.6 mm, 5 μm particle size). FFA was separated using an isocratic mobile phase (80% acetonitrile and 20% phosphoric acid, 0.1%, pH 3.75) at 1 mL/min and detected using UV absorbance at 218 nm. The rate constant for $^1O_2$ and FFA reaction is $1.8 \times 10^8$ $M^{-1}s^{-1}$. $\cdot O_2^-$ steady state concentration was calculated by measuring the decay of nitroblue tetrazolium (NBT, Sigma, 98%) using UV-vis spectroscopy. NBT has an absorption peak at 260 nm. The rate constant for $\cdot O_2^-$ and NBT reaction was $5.9 \times 10^4$ $M^{-1}s^{-1}$. $H_2O_2$ concentration was measured using an Amplex Red (Sigma, 98%) fluorescence probe. The fluorescence of the product was monitored. The excitation wavelength was 550 nm and emission wavelength is 580 nm. The steady state concentration of $OH \cdot$ was calculated by measuring the product of $OH \cdot$ reacting with benzoic acid (Sigma, 99.5%) using HPCL. Hydroxybenzoic acid was separated using a mobile phase (80% acetonitrile and 20% water) at 1 mL/min and detected using UV absorbance at 255 nm for the p-isomer, and 300 nm for the o- and m-isomers. The concentration factor used to convert total hydroxybenzoic acid from p-isomer was 5.87. The rate constant for $OH \cdot$ and benzoic acid reaction is $6.0 \times 10^9$ $M^{-1}s^{-1}$.

B2c) Scavenger Quenching Experiments

The scavengers used were sodium chromate (VI) (0.05 mM, Sigma, 99.5%) for electron, TEMPO for $\cdot O_2^-$ (1 mM, Sigma, 99%), L-histidine for $^1O_2$ (0.5 mM, Sigma, 99%), catalase for $H_2O_2$ (200 U/mL, Sigma), and isopropanol (0.5 mM, Sigma) for $OH \cdot$ and sodium oxalate (0.5 mM, Sigma, 99.5%). The scavengers were added in to the bacteria water solution before photo illumination. Bacterial concentrations were measured at different time of illumination using standard spread plating techniques. Each sample was serially diluted and each dilution was plated in triplicate onto trypticase soy agar and incubated at 37° C. for 18 h.

The invention claimed is:

1. A method for water treatment, the method comprising:
   providing an active material selected from the group consisting of: $MoS_2$, $MoSe_2$, $WS_2$, $WSe_2$, $Mo_xW_{1-x}S_2$, $Mo_xW_{1-x}Se_2$, $MoS_ySe_{2-y}$, $WS_ySe_{2-y}$, and $Mo_xW_{1-x}S_ySe_{2-y}$; wherein 0<x<1 and wherein 0<y<2;
   wherein the active material is configured as one or more layered nanostructures having exposed layer edges;
   providing a metal catalyst disposed on the active material;

disposing the active material and metal catalyst in water to be treated; and providing an excitation to the active material to generate one or more reactive oxygen species by dissociation of water, wherein the reactive oxygen species provide water treatment.

2. The method of claim 1, wherein the excitation is optical illumination of the active material.

3. The method of claim 2, wherein the optical illumination is solar radiation.

4. The method of claim 1, further comprising disposing a return electrode in the water to be treated, wherein the excitation comprises an electrical voltage applied between the active material and the return electrode.

5. The method of claim 4, wherein the excitation further comprises optical illumination of the active material.

6. The method of claim 1, wherein the water treatment provides disinfection of water by killing biological contaminants with the reactive oxygen species.

7. The method of claim 1, wherein the water treatment provides chemical treatment of water by reacting chemical contaminants with the reactive oxygen species.

8. The method of claim 1, wherein the metal catalyst is selected from the group consisting of: Cu, Au and alloys or mixtures thereof.

9. The method of claim 1, wherein the metal catalyst is disposed on the exposed layer edges of the active material.

* * * * *